United States Patent [19]
Slocum

[11] Patent Number: 5,218,554
[45] Date of Patent: Jun. 8, 1993

[54] FLUID DETECTION SYSTEM WITH SOLID STATE INPUTS

[75] Inventor: Laurence S. Slocum, Indianapolis, Ind.

[73] Assignee: Emerson Electric Co., St. Louis, Mo.

[21] Appl. No.: 588,088

[22] Filed: Sep. 25, 1990

[51] Int. Cl.$^5$ .................................................. G08B 19/00
[52] U.S. Cl. ..................................... 364/510; 73/49.2; 340/521
[58] Field of Search ................ 364/510, 558; 73/49.2; 340/521, 522, 603; 137/487.5, 624.11

[56] References Cited

U.S. PATENT DOCUMENTS

| | | | |
|---|---|---|---|
| 4,736,193 | 4/1988 | Slocum et al. | 340/603 |
| 4,740,777 | 4/1988 | Slocum et al. | 73/49.2 T |
| 4,831,360 | 5/1989 | Clarkson et al. | 73/49.2 T |
| 4,835,522 | 5/1989 | Andrejasich et al. | 73/49.2 T |
| 4,855,714 | 8/1989 | Clarkson et al. | 73/49.2 T |
| 5,066,944 | 11/1991 | Slocum | 73/49.2 T |

Primary Examiner—Parshotam S. Lall
Assistant Examiner—Ellis B. Ramirez
Attorney, Agent, or Firm—Robert F. Meyer

[57] ABSTRACT

A fluid status detection system includes a controller that has eight sets of sockets for mechanically receiving a solid state input module. The module may be either an one of two A.C. responsive moduled responsive to two different A.C. voltage ranges or a D.C. responsive module. Either module provides the same output, a one-bit-digital signal, to the controller via the sockets. The controller includes a relay, an alarm, and a display. The operator may select one or more indicator conditions individually for each of the socket sets from a plurality of possible indicator alarm conditions and store the conditions in the controller. The controller then responds to the one-bit-digital signals to provide an alarm or other programmed indication that a device, such as a fire alarm, connected to a particular socket set has been activated. The modules respond to a wide range of voltages, thus a wide range of devices may be connected to the controller.

14 Claims, 22 Drawing Sheets

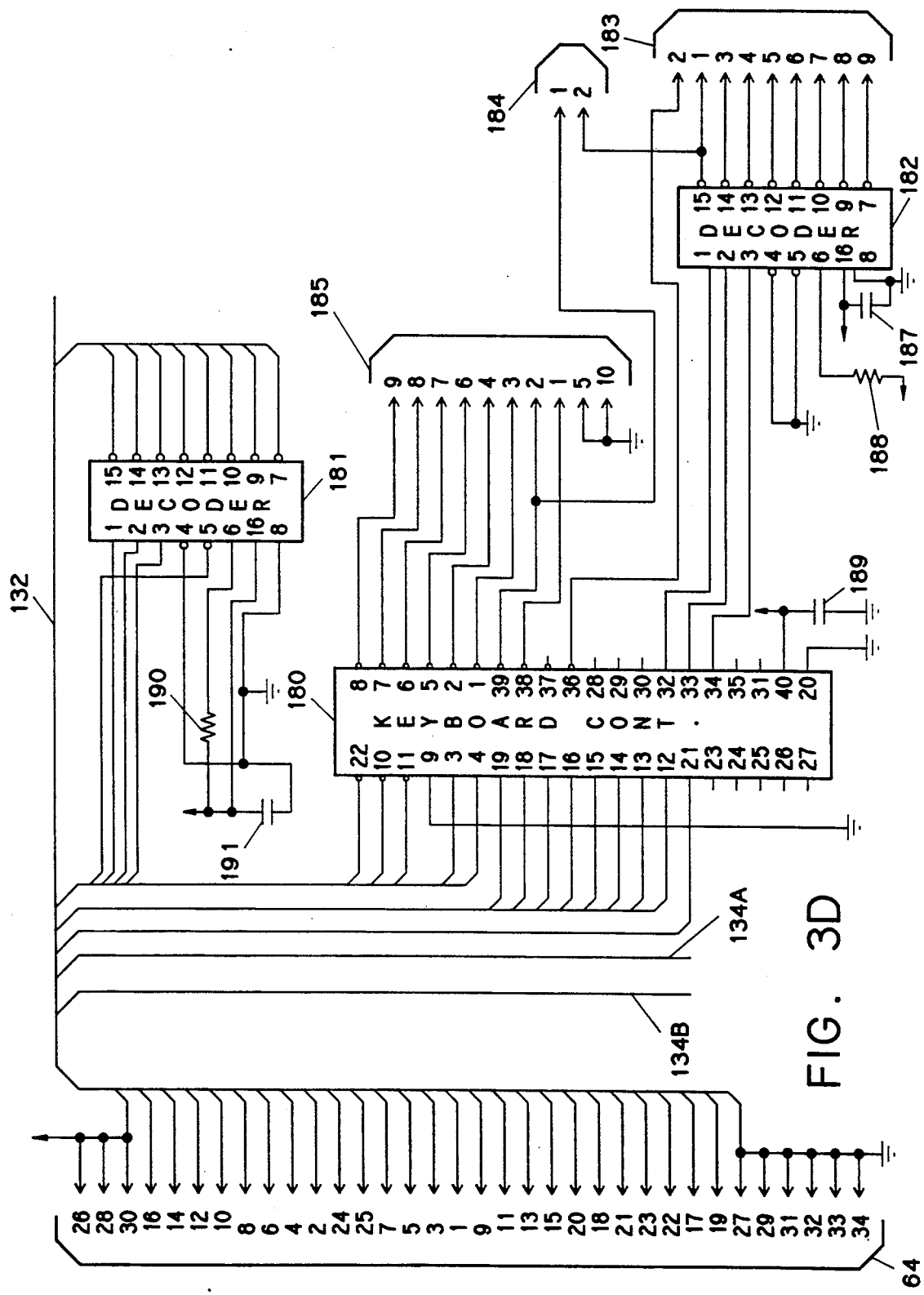

SWITCH NETWORK
TRUTH TABLE

FLUID DETECTION SYSTEM WITH SOLID STATE INPUTS

BACKGROUND OF THE INVENTION

1. Field of the Invention

The present invention in general relates to fluid detection systems that include a central controller and a plurality of probes remote from the controller for detecting the fluid status at the probe locations, and more particularly to such a system that is programmable.

2. Description of the Prior Art

Fluid detection systems that include a central controller and numerous probes that are controlled by the controller and report on the fluid status at remote probe locations are well known. Typically such systems are used to detect leaks in underground hydrocarbon tanks. U.S. Pat. No. 4,835,522 on an invention of Raymond J. Andrejasich, Laurence S. Slocum and Sara M. Mussman describes a programmable fluid detector capable of responding to a variety of different probe types and including relays that may be programmed to respond to a variety of input signals. In this system and in all known prior systems in the field of the invention the controller is designed to connect to specific probes that are generally produced by the manufacturer of the controller.

SUMMARY OF THE INVENTION

It is an object of the invention to provide a fluid detection system that overcomes one or more of the disadvantages of prior art fluid detection systems.

It is a further object to provide the above object in a fluid detection system in which the controller can be connected to probes not specifically designed to connect to the system.

It is still a further object of the invention to provide one or more of the above objects in a fluid detection system in which probes and other devices, such as fire alarms, made by a variety of manufacturers may be connected to the system.

It is another object of the invention to provide a fluid detection system that provides one or more of the above objects and which can be programmed to respond appropriately to a wide variety of probes and devices not specifically designed to be operated with the system.

It is yet another object of the invention to provide a fluid detection system that provides one or more of the above objects and which permits either A.C. or D.C. devices to be connected to the system as probes and can respond appropriately to such devices.

The invention provides a fluid status detection system comprising: a controller and a plurality of probes for sensing the status of fluids at probe locations remote from the controller, each of the probes including means for providing a probe signal to the controller indicative of the fluid status at the probe location, the controller comprising: one or more socket means for mechanically receiving an input means for providing a one-bit-digital signal to the controller via the socket; indicator means for providing an indication that a probe signal or a one-bit-digital signal has been received: storage means for storing indicator conditions; selecting means for permitting an operator to select one or more indicator conditions individually for each of the probes and for each of the one or more socket means from a plurality of possible indicator alarm conditions and to store the conditions in the means for storing; activation means responsive to the probe signals and the one-bit-digital signals from the one or more socket means and communicating with the storage means for activating the indicator means upon receiving one or more signals corresponding to one or more of the stored indicator conditions. Preferably, the system further includes one or more input means providing a one-bit-digital signal to the controller via the socket means upon receipt of an electrical signal having a voltage over a range of voltages commonly in use, each of the input means including a member for fitting into the socket. Preferably, the voltage applied to the input means may be either an A.C. voltage or a D.C. voltage. Preferably, the voltage range is between 3 and 32 volts D.C., 90 to 140 volts, A.C., or 180 to 280 volts A.C. Preferably the indicator means comprises one or more relays. Preferably, the indicator means further comprises an audible alarm. Preferably, the selecting means includes means for selecting whether or not the signal is considered to be an indication of an alarm, and the activation means includes: means for activating one or more of the relays, means for determining if the received signal is considered to be an alarm, and means for activating the audible alarm if the signal is considered to be an alarm.

The invention not only provides a fluid detector that may be used with a wide variety of probes that are produced by a wide variety of manufacturers, but also provides a relatively inexpensive, simple, and flexible interface to such detectors and thus does not unduly complicate the system. Numerous other features, objects and advantages of the invention will become apparent from the following description when read in conjunction with the accompanying drawings.

BRIEF DESCRIPTION OF THE DRAWINGS

In the drawings:

FIGS. 3A through 3F show an electrical circuit diagram of the input/output circuit board according to the preferred embodiment of the invention;

DESCRIPTION OF THE PREFERRED EMBODIMENT

Figure 1:
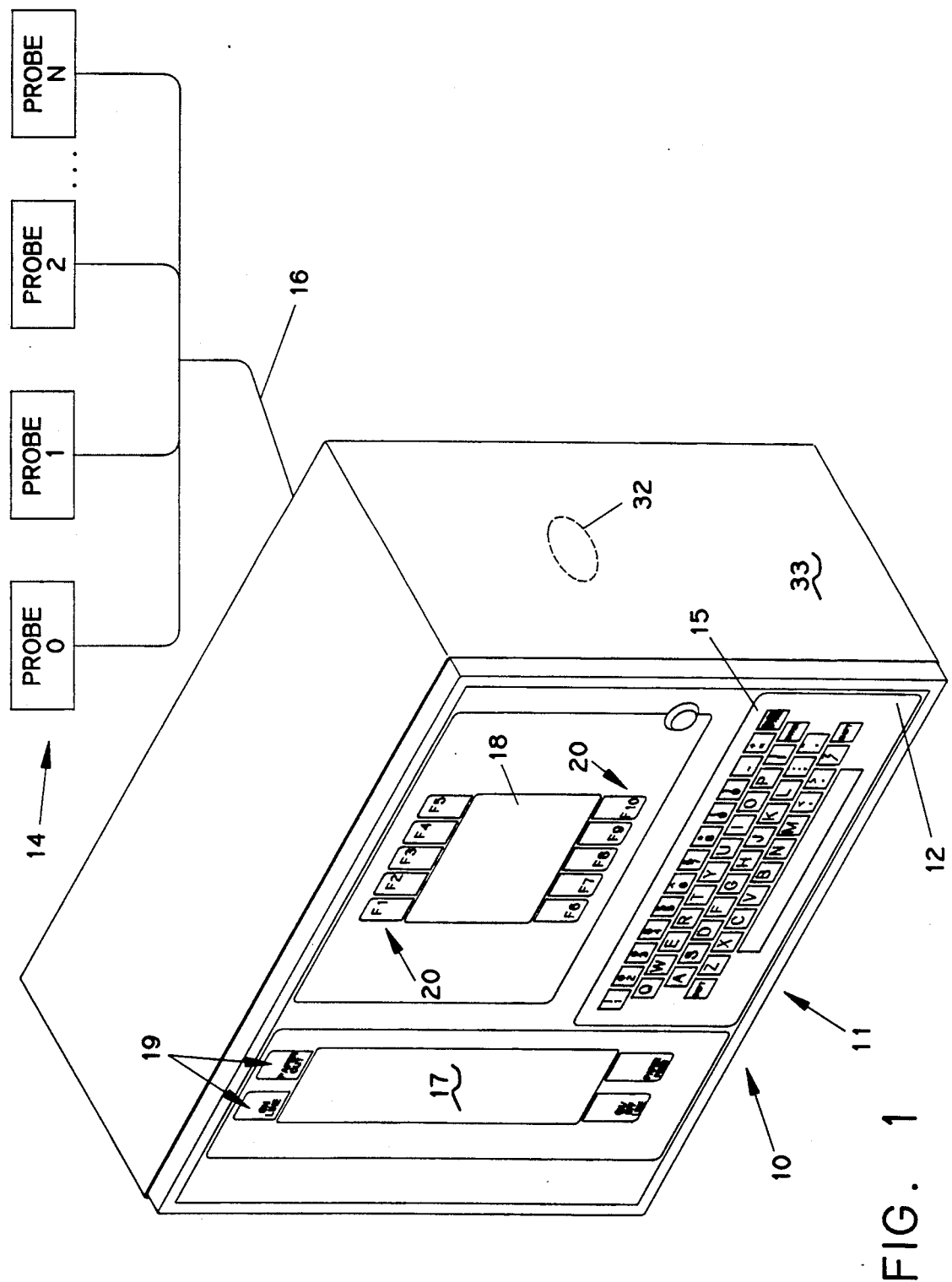
FIG. 1 shows the preferred embodiment of a fluid detection system according to the invention including a perspective view of the controller and a diagrammatic view of n probes.

Turning attention to the drawings, FIG. 1 shows the preferred embodiment of a fluid detection system 10 according to the invention. It should be understood that the particular embodiment described below is exemplary of the invention only, and is not intended to limit the invention. The system 10 includes a controller 12 and a multiplicity of probes 14 which are located remotely from the controller 12. The probes 14 are connected to the controller 12 via a cable 16. The probes 14 will not be discussed in detail herein, and can be any one of a variety of fluid probes, such as those produced by Pollulert Systems, P.O. Box 706, Indianapolis, Id. 46206. The controller 12 includes an input field wiring connector 213 (FIG. 4C) to which a variety of other devices (not shown) such as fire alarms, liquid level gauges, etc. may be attached. Each device is attached to one of a number of pairs of connector terminals, such as 213A and 213B. Associated with each terminal pair is a set of five sockets, such as 215 through 219. A five-pin input module, such as 214A, may be plugged into each set of sockets. The input module may be either A.C. or D.C. depending on the device to be attached to the terminals 213A and 213B. Each module, whether A.C. or D.C., provides a one-bit-digital signal output on lines 203. Indicator conditions, which provide the controller with directions on how to respond to the one-bit-signal, may be selected by an operator using keyboard system 11, which includes keyboard 15 and function keys 20. The conditions selected are stored in memory 70 (FIGS. 2C and 2D). When a one-bit signal is provided by a module, such as 214A, it is processed by central processing unit 24 (FIG. 2F) which activates an indicator means, such as a relay (FIG. 4B), a printer 17, display 18 (FIG. 1) or LED 19, or audio transducer 32, to provide an appropriate indication that the one-bit-digital signal has been received.

Figure 2A:
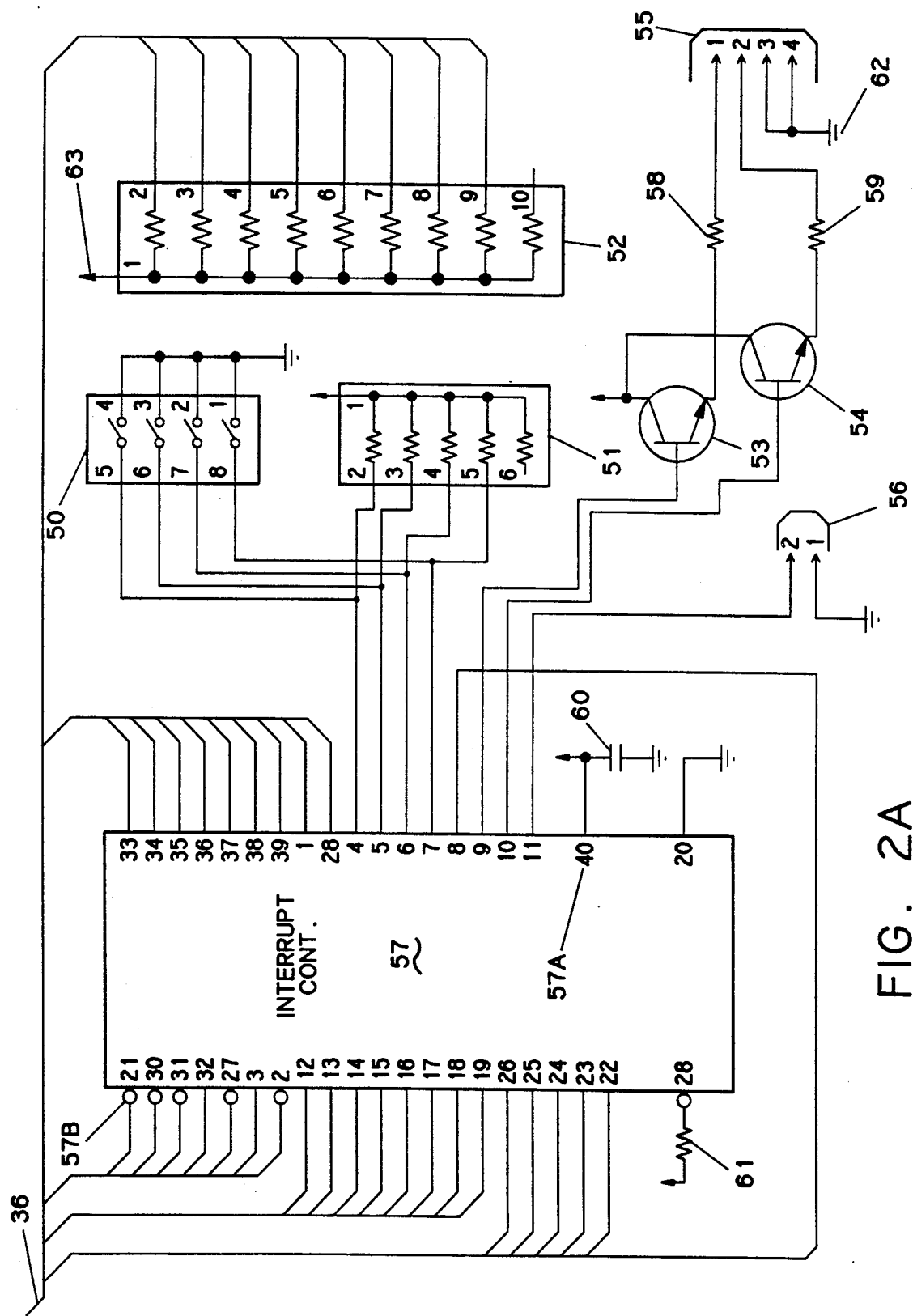
FIGS. 2A through 2H show an electrical circuit diagram of the central processing unit circuit board of the preferred embodiment of a fluid detection system according to the invention.
Figure 2B:
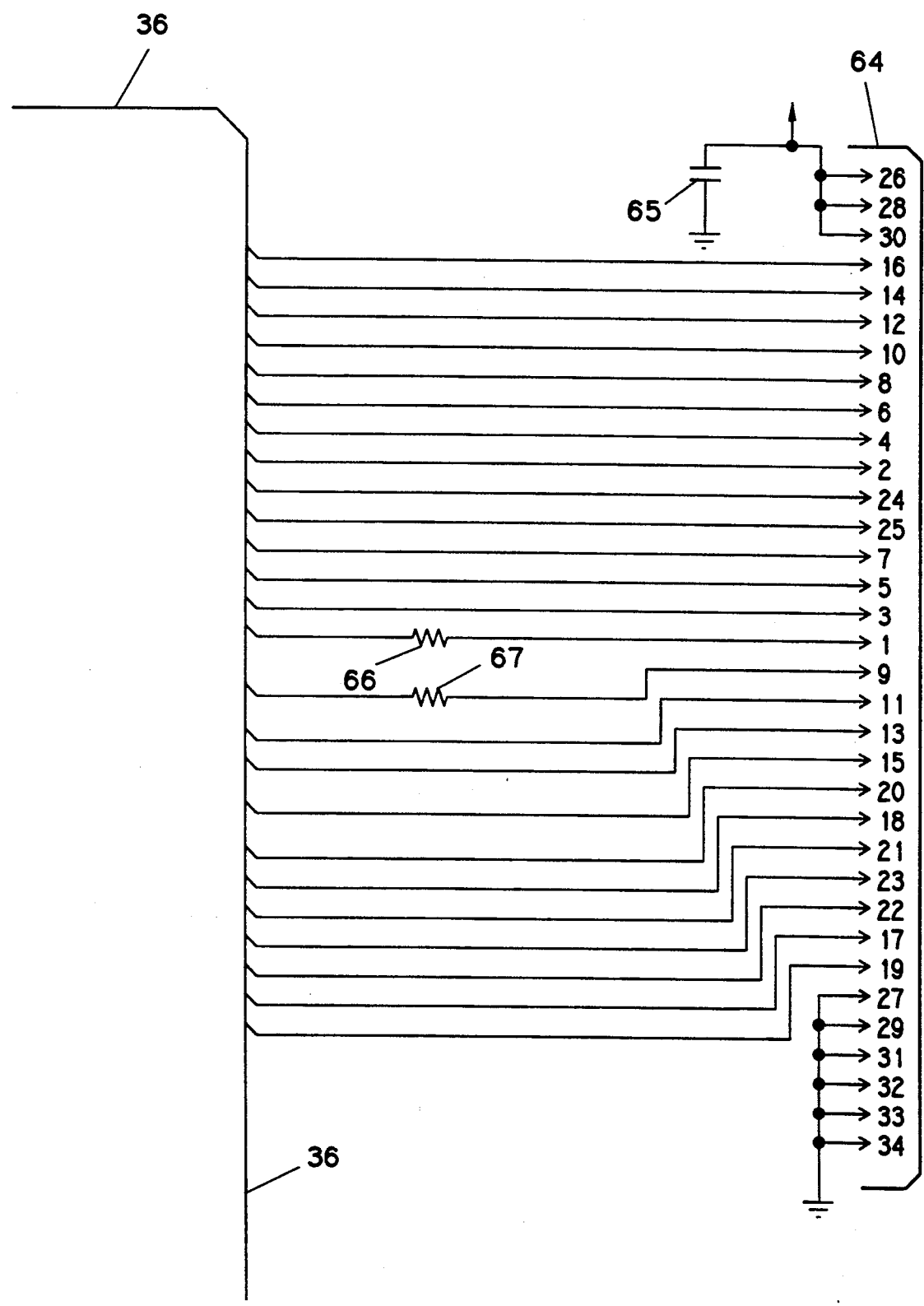
Figure 2C:
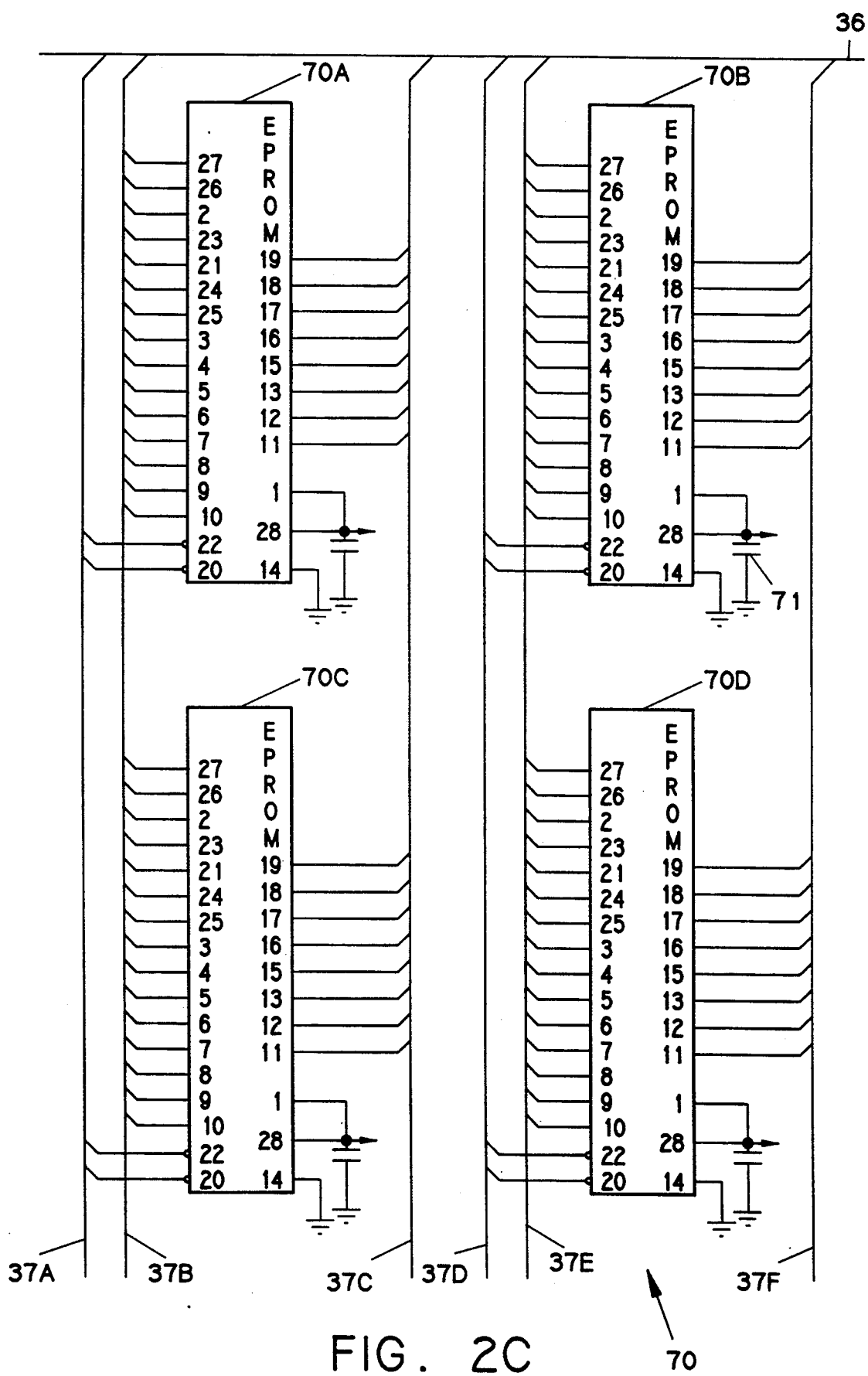
Figure 2D:
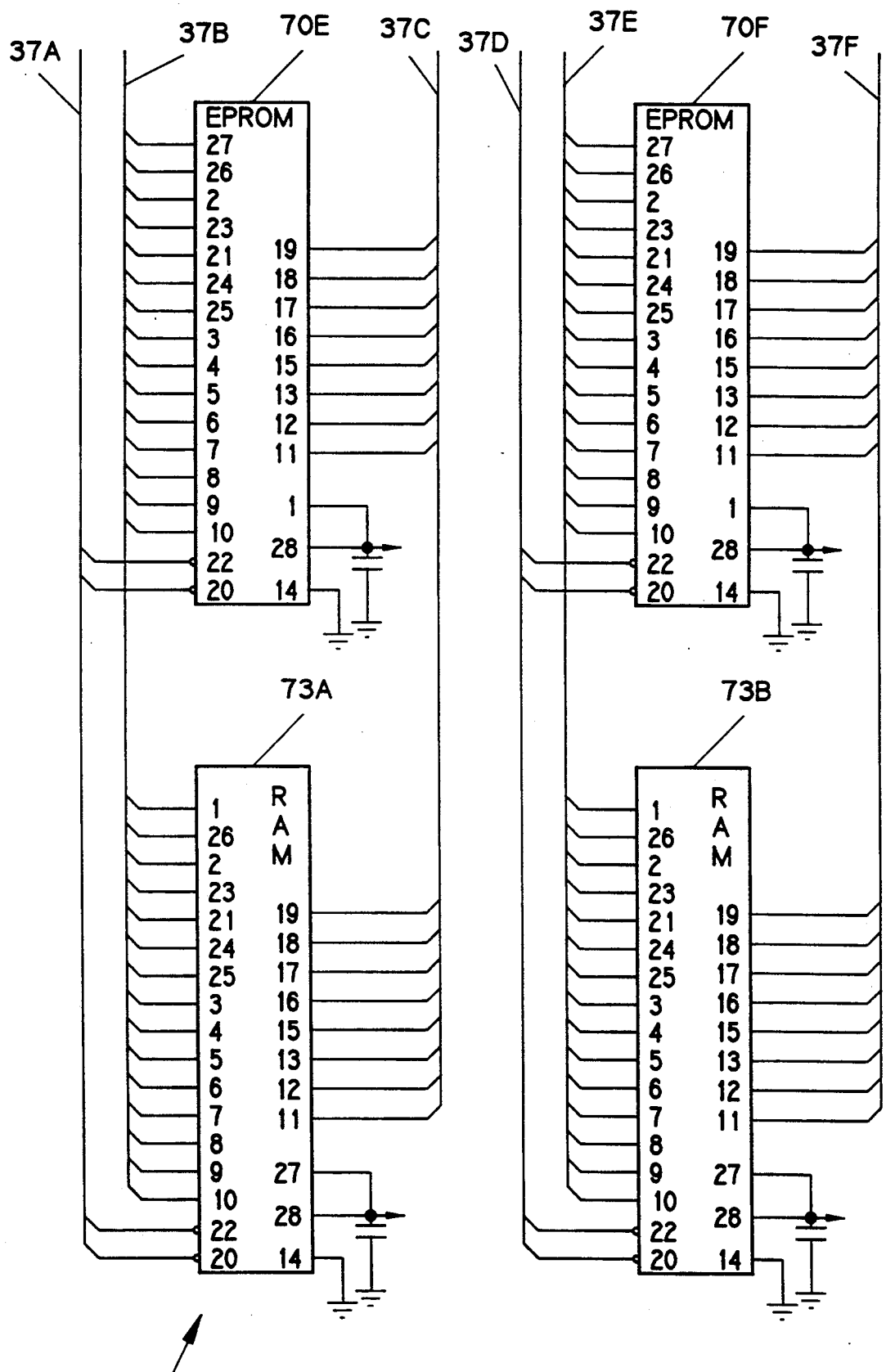
Figure 3A:
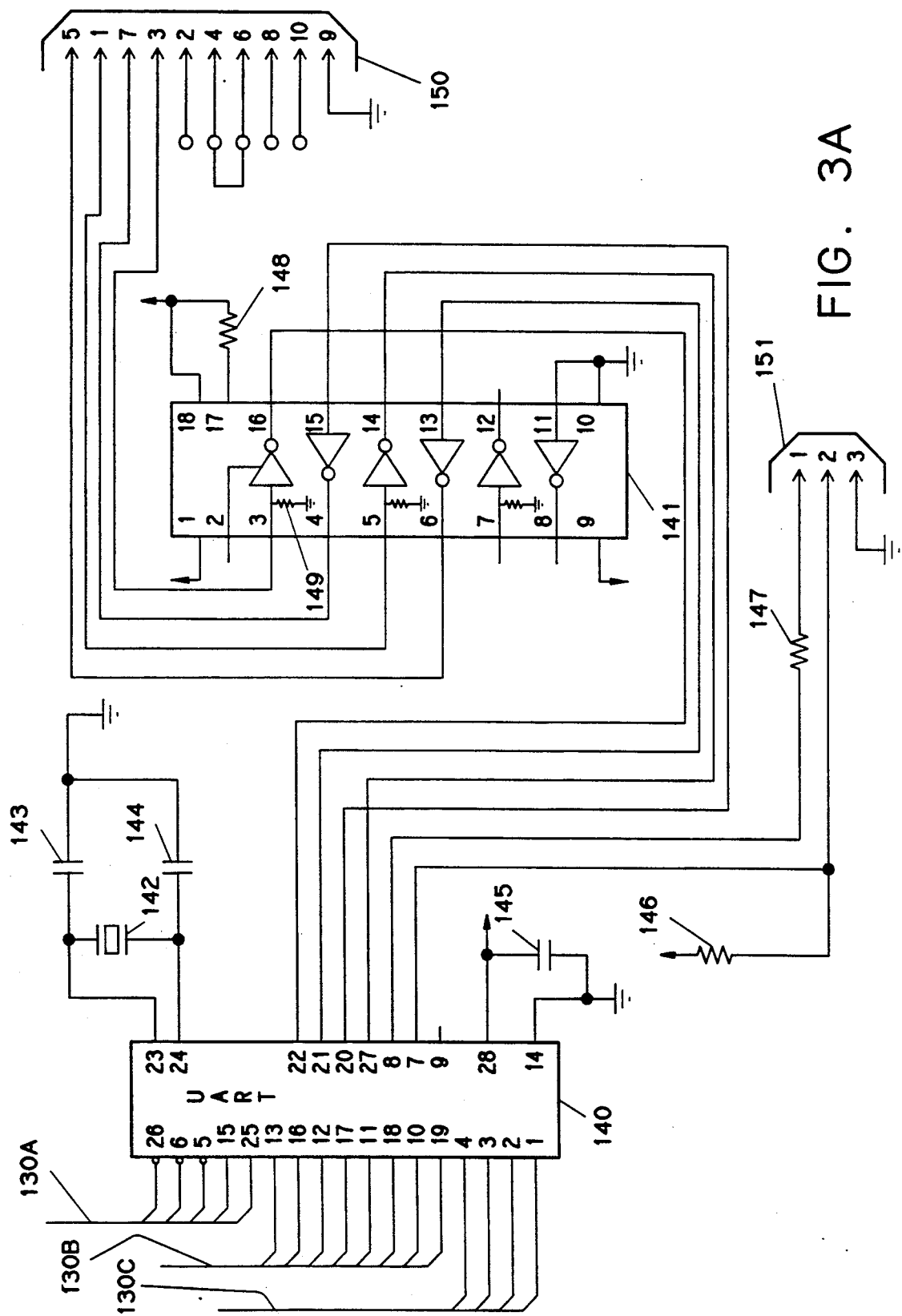
Figure 3B:
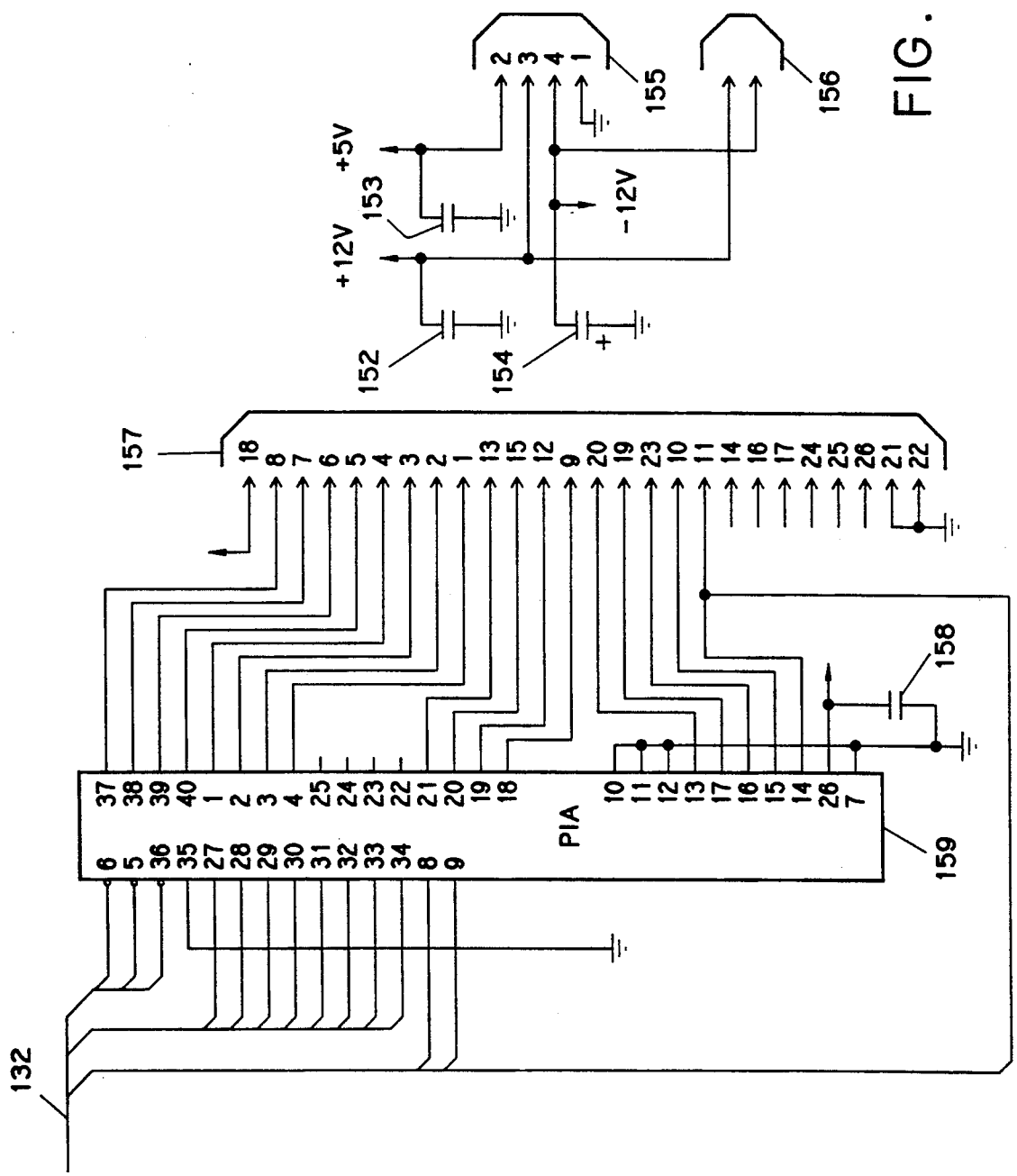
Figure 3C:
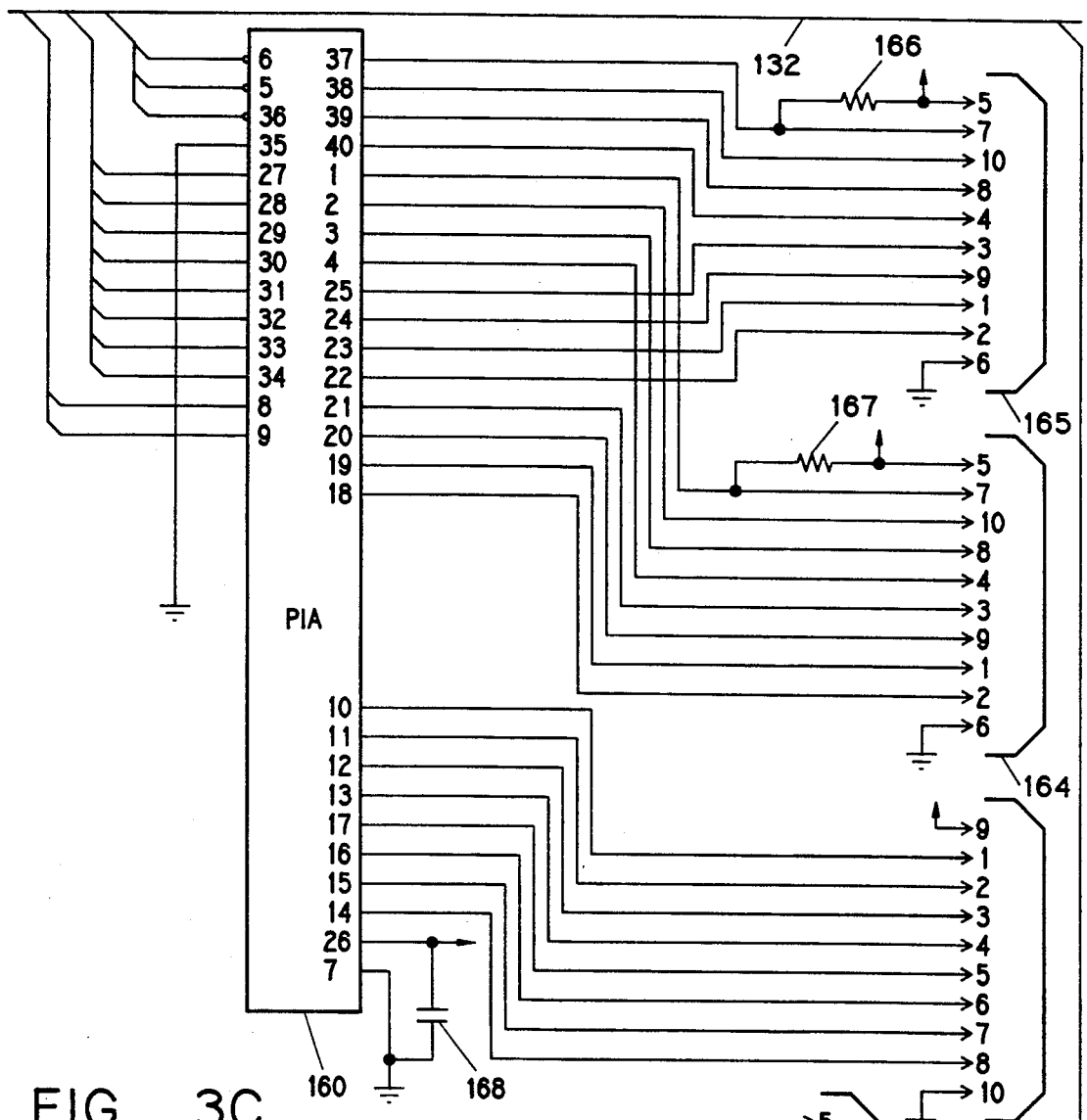
Figure 3C:
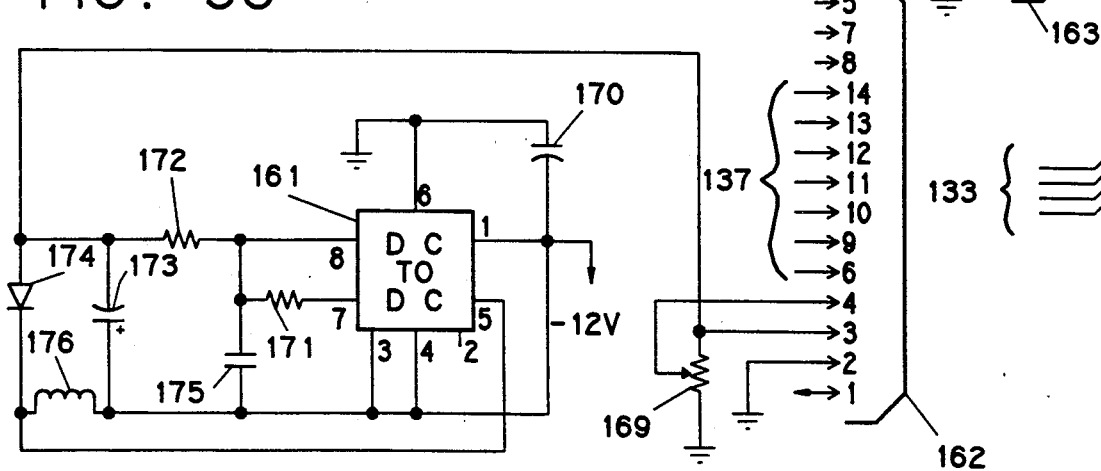
Figure 3E:
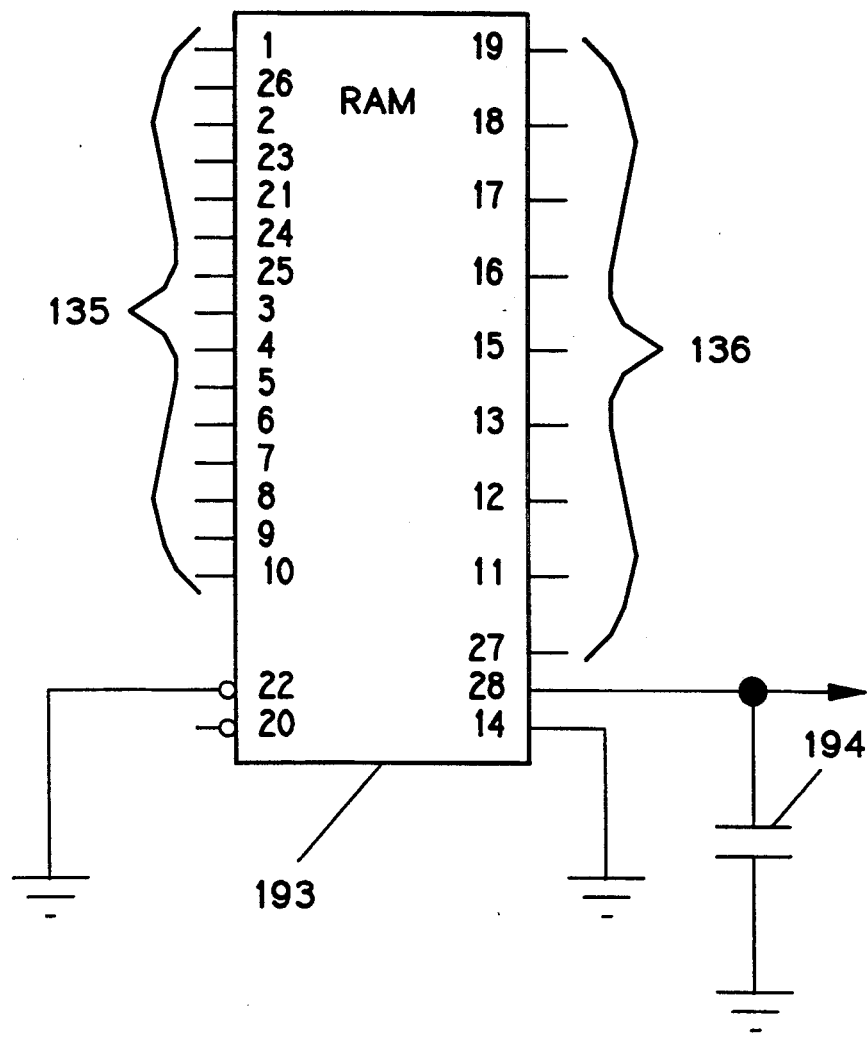
Figure 3F:
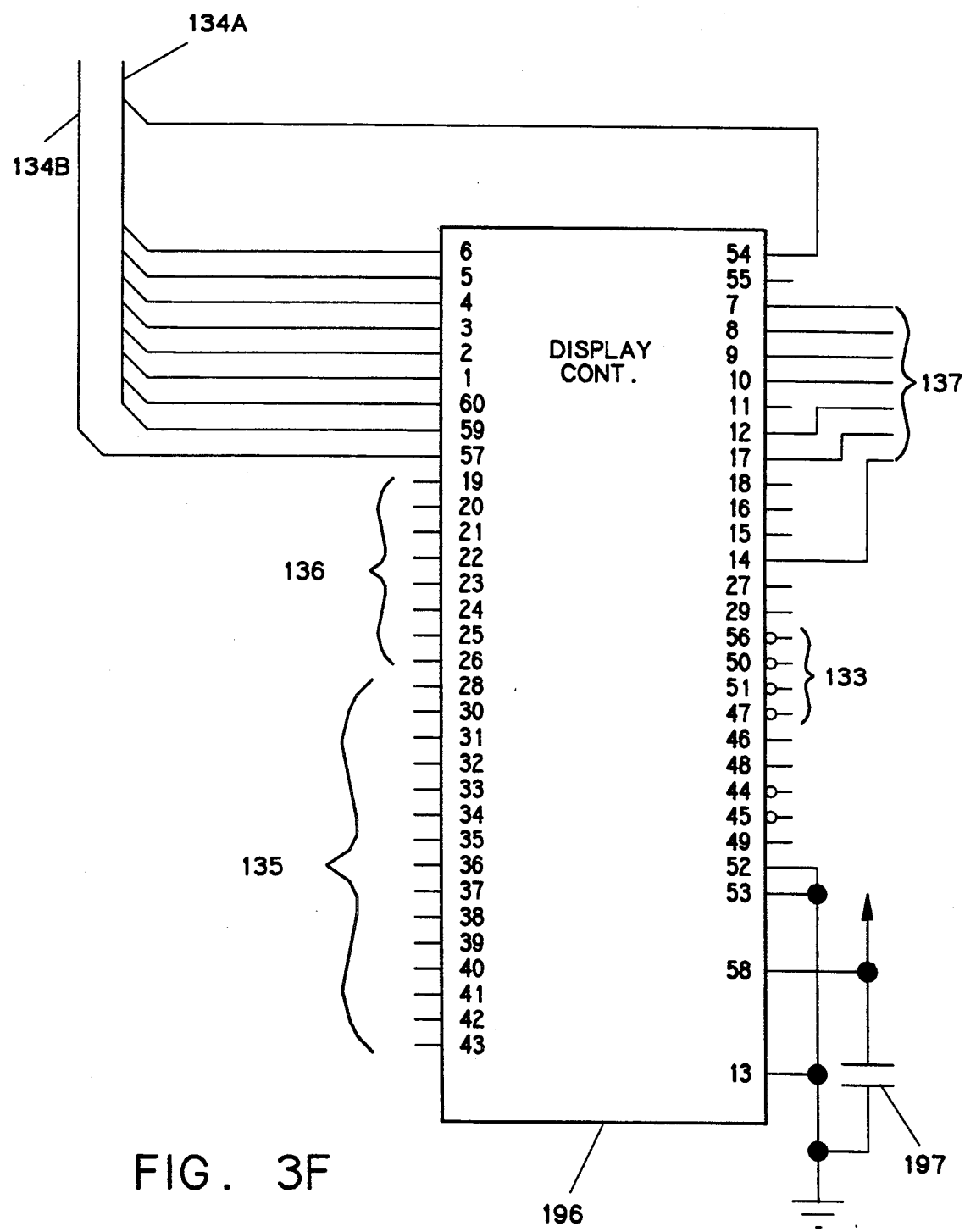
Figure 4A:
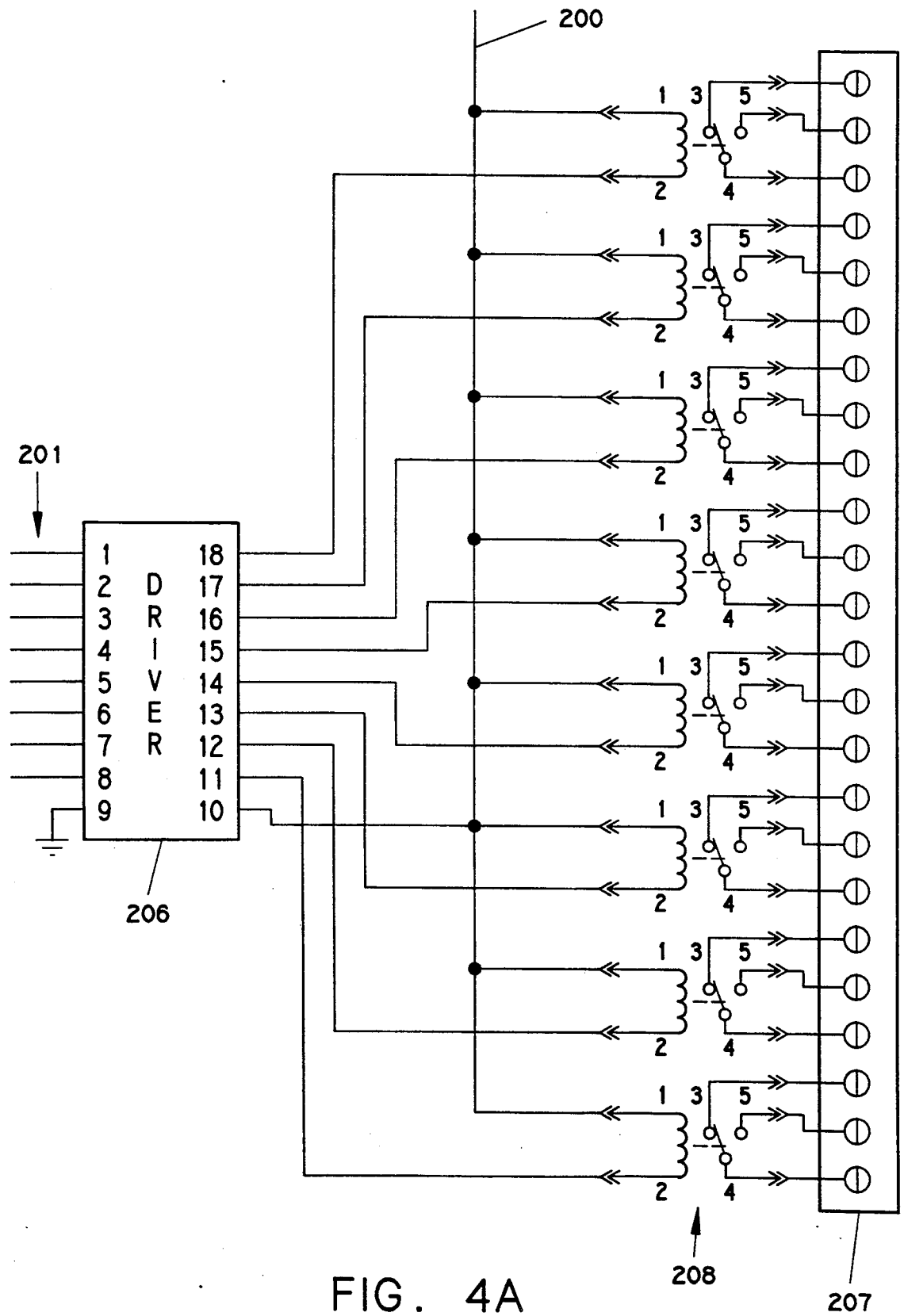
FIGS. 4A through 4E show an electrical circuit diagram of the relay/solid state input circuit board according to the preferred embodiment of the invention.
Figure 4B:
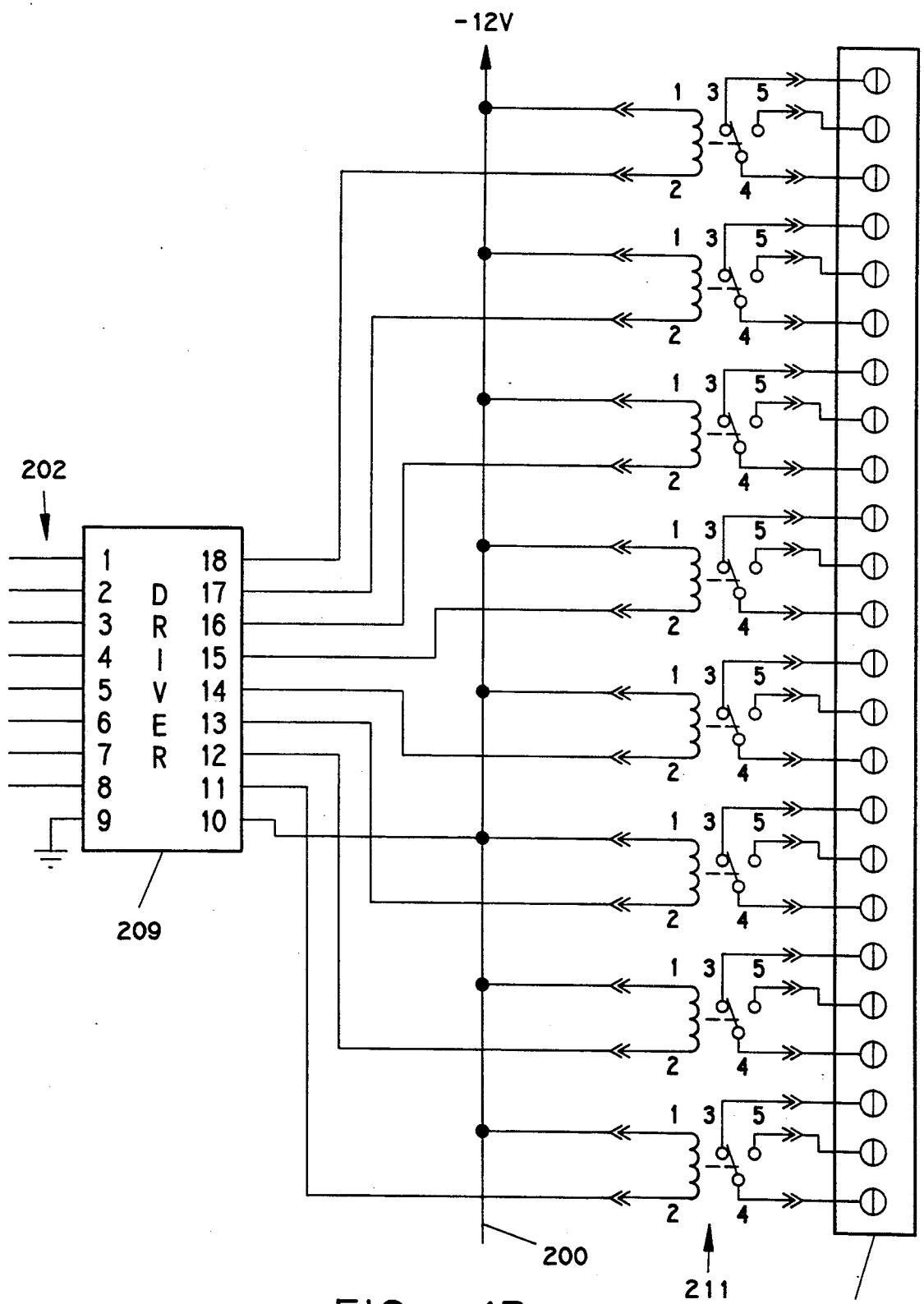
Figure 4C:
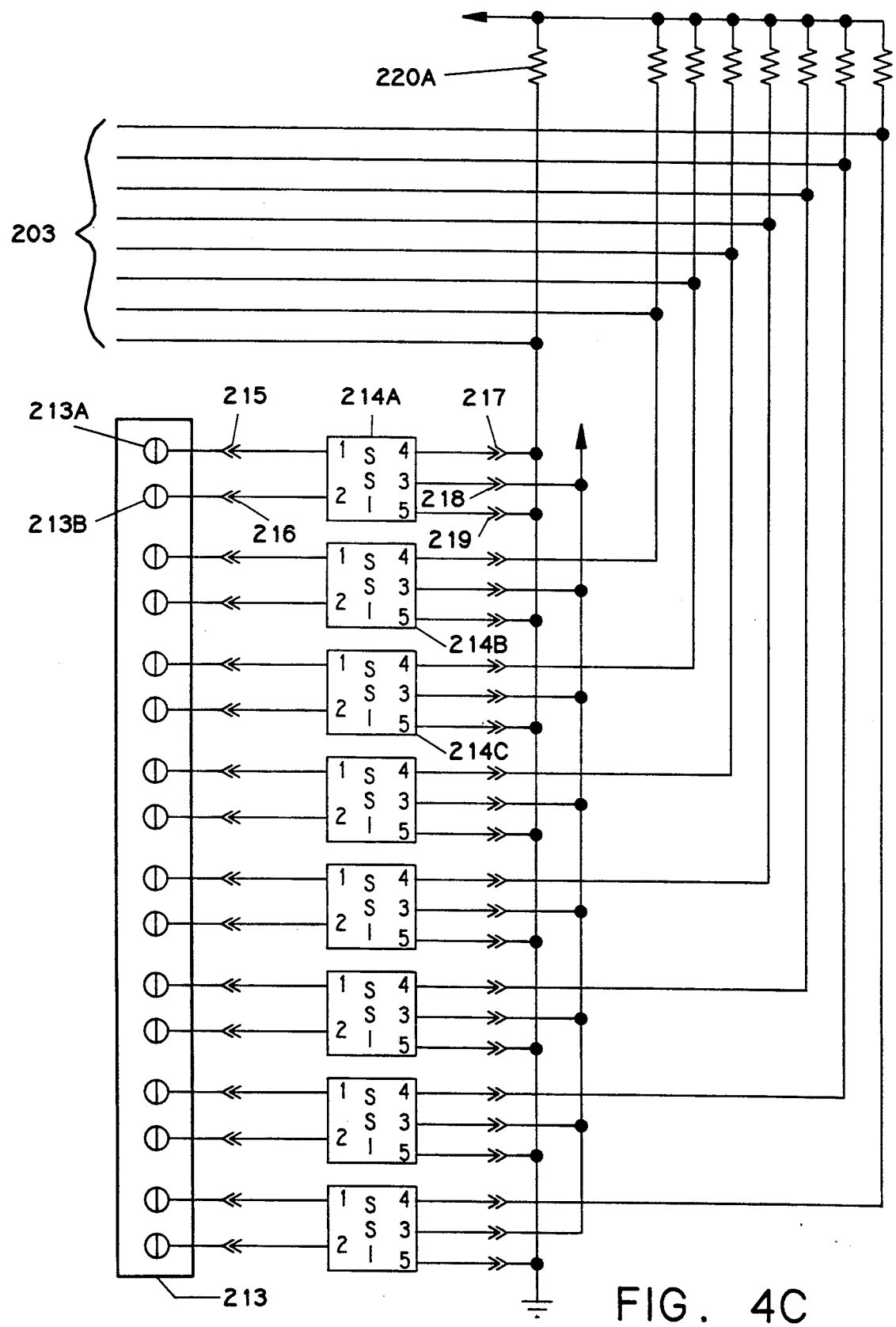
Figure 4D:
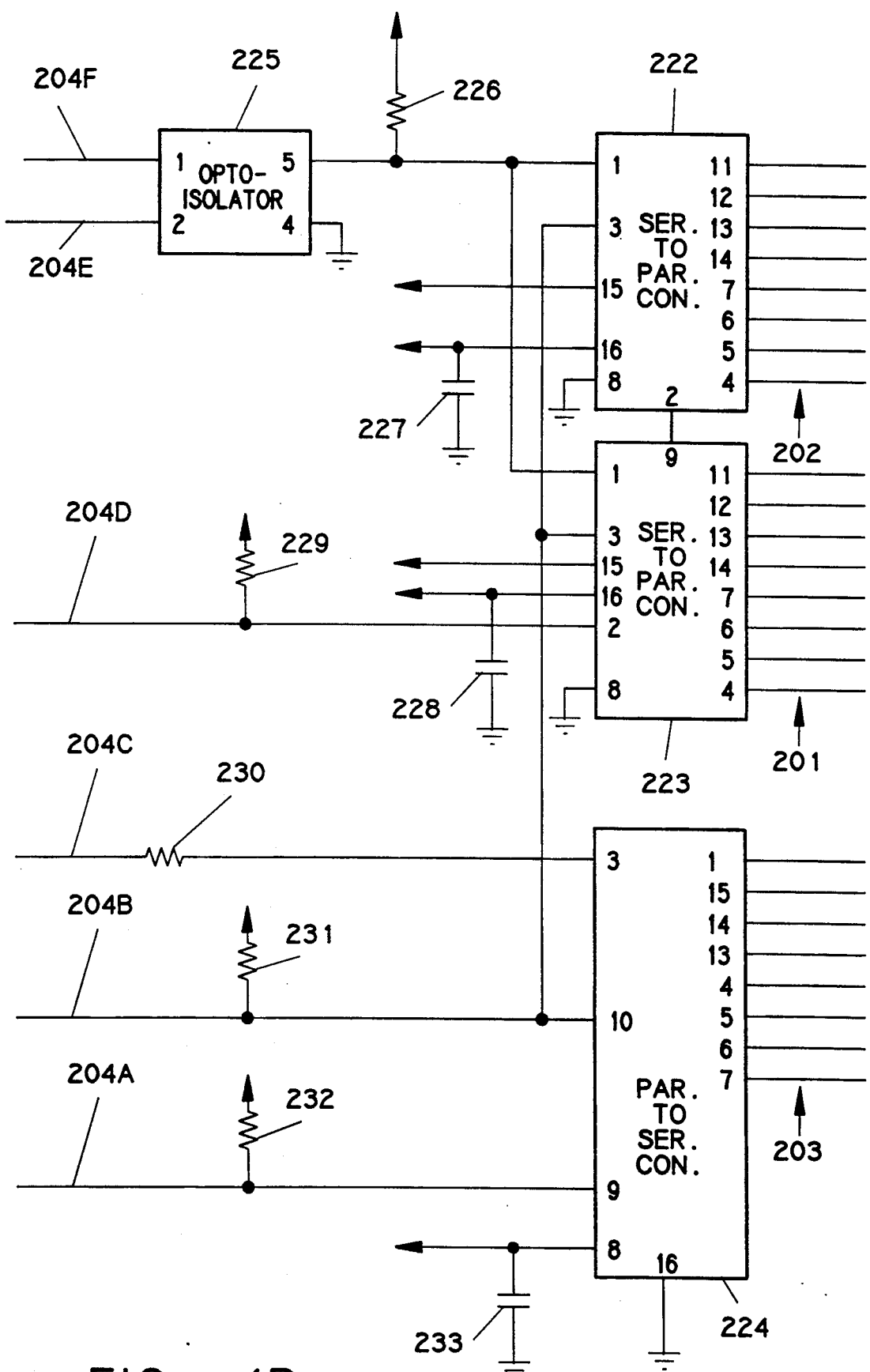
Figure 4E:
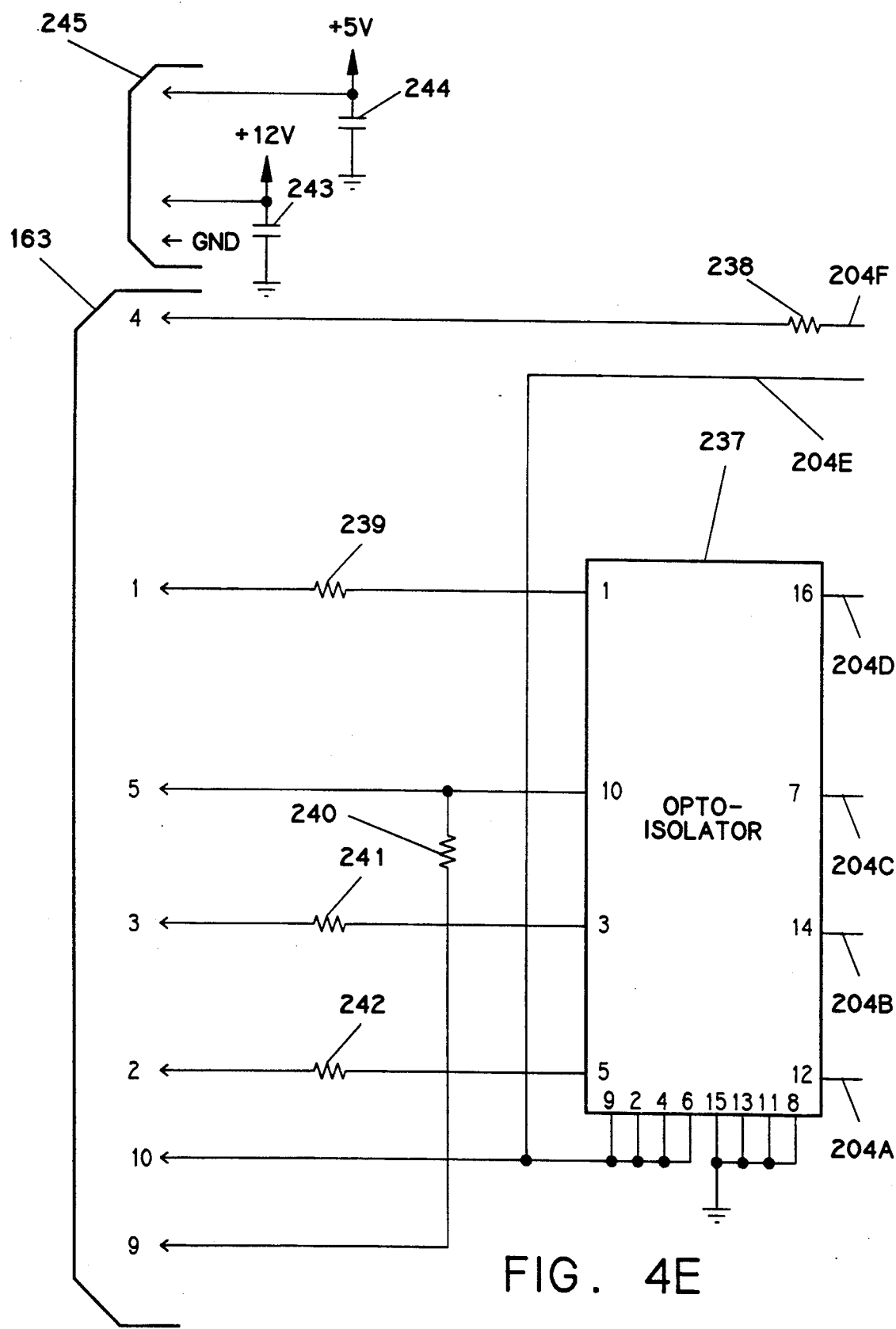
Figure 5:
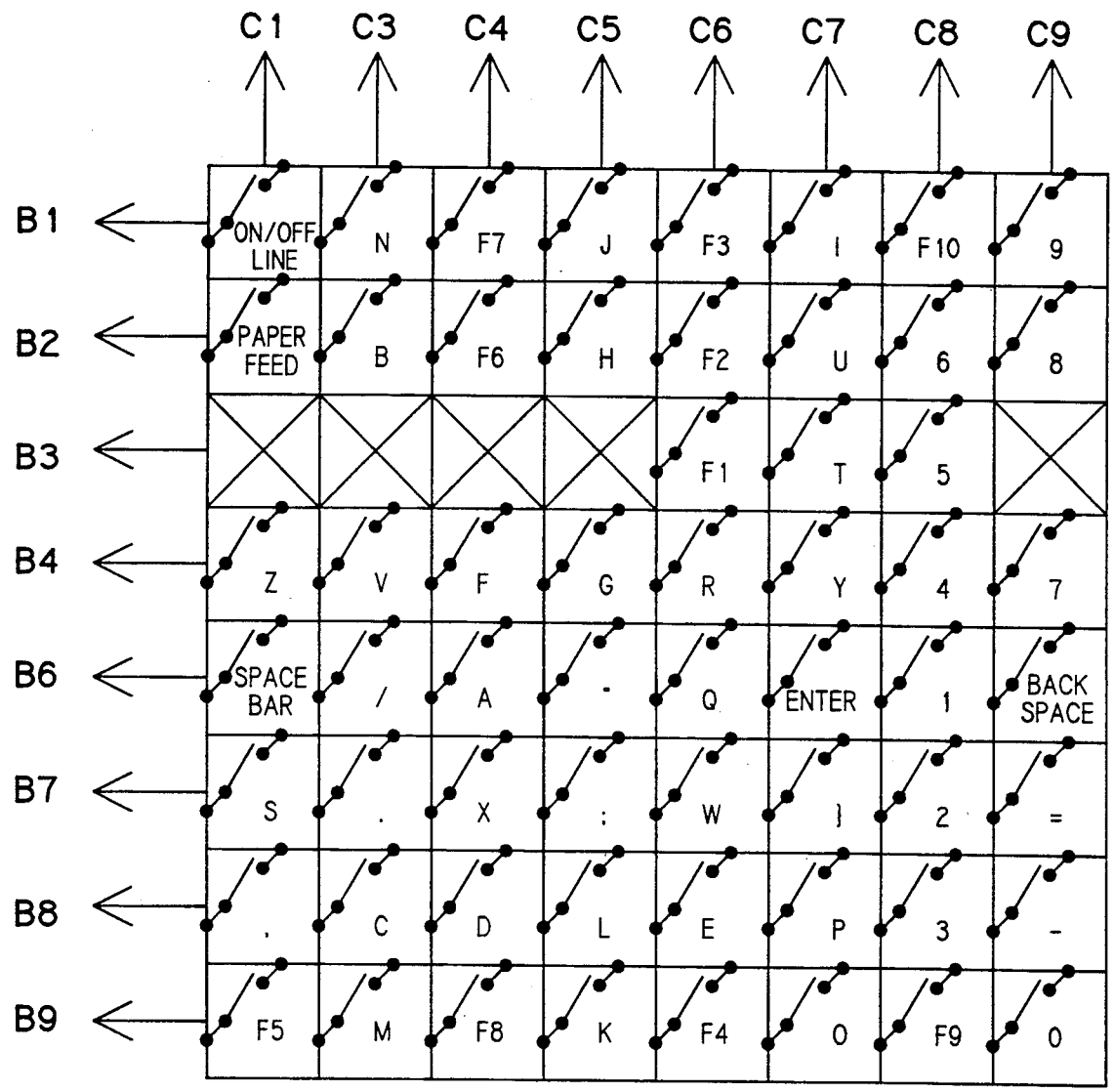
FIG. 5 shows the keyboard switch network truth table of the embodiment of FIG. 1.
Figure 5:
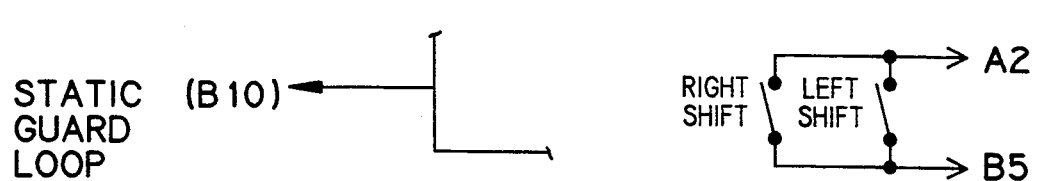

Turning now to a more detailed description of the invention, the preferred embodiment of the electronic circuit of the invention is shown in FIGS. 2A through 5. FIGS. 2A through 2H show the central processing unit circuit board, FIGS. 3A through 3F show the input-/output circuit board, FIGS. 4A through 4E show the relay/solid state input circuit board, and FIG. 5 shows the keyboard circuit. There is also an interface circuit between the controller and the probes, however this circuit is conventional and will therefore not be discussed in detail. Turning to FIGS. 2A through 2H, we shall first describe how these Figs. are interconnected, and then discuss the details of each. FIG. 2A is connected to FIG. 2B via cable 36, and is in turn connected to FIG. 2C via the same cable. If FIG. 2D is placed below FIG. 2C the connections of the two via cables 37A through 37F become clear. FIG. 2E connects to FIG. 2C via cable 36 and connects to FIG. 2F via cable 38A. A set of three electrical lines 39A and another set of three lines 39B as well as cable 40 are shown at both the left of FIG. 2E and the right of FIG. 2G making the connections between these two Figs. clear. FIG. 2G connects to FIG. 2F via lines 41 which connect to the left side of CPU 24, and also via the three lines 43A, 43B, and 43C. FIG. 2H connects to FIG. 2G via cable 44. FIG. 2H connects to FIG. 2F via lines 45A, 45B, 46A, 46B, 46C, 47 and 48.

Figure 2E:
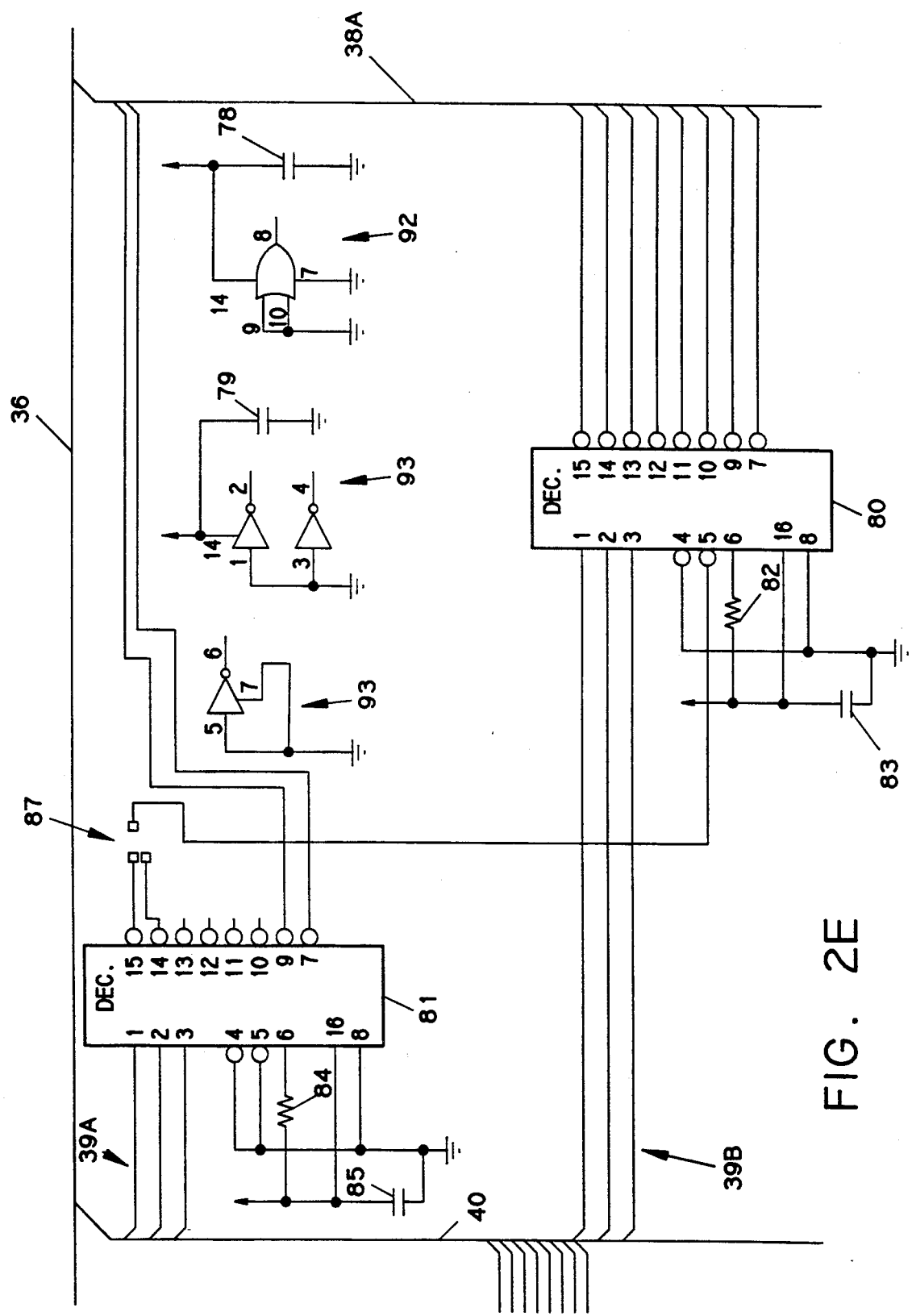
Figure 2F:
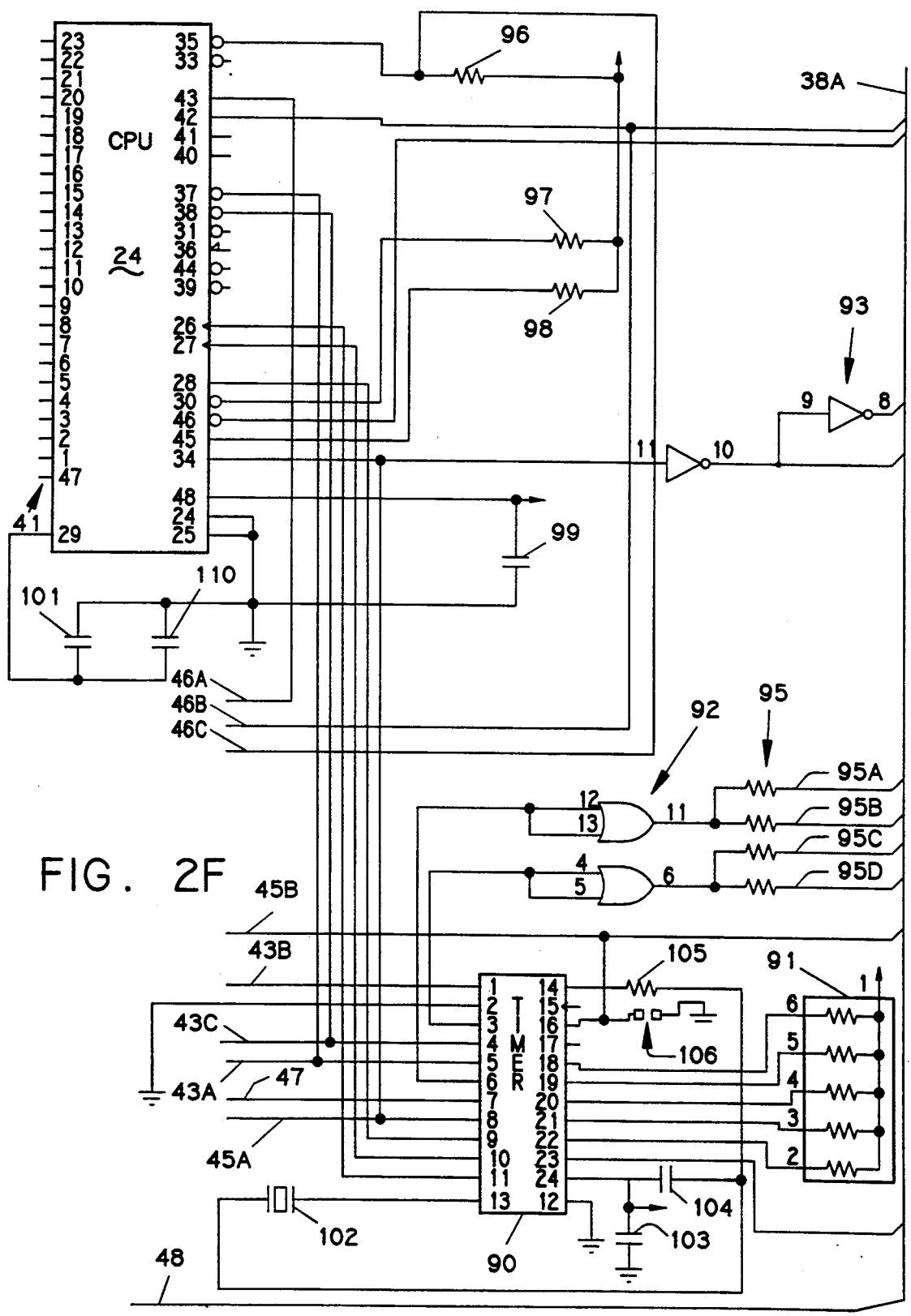
Figure 2G:
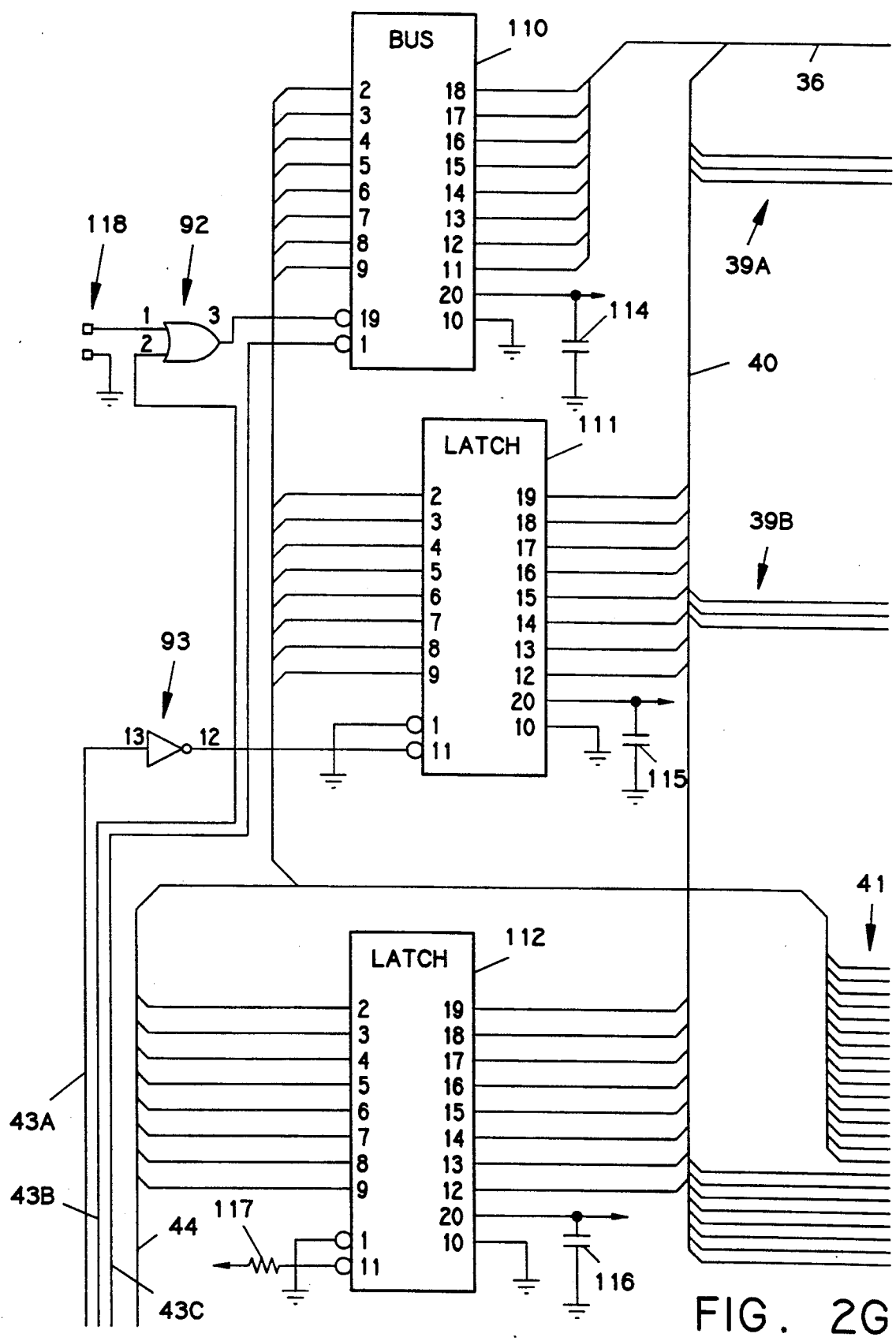
Figure 2H:
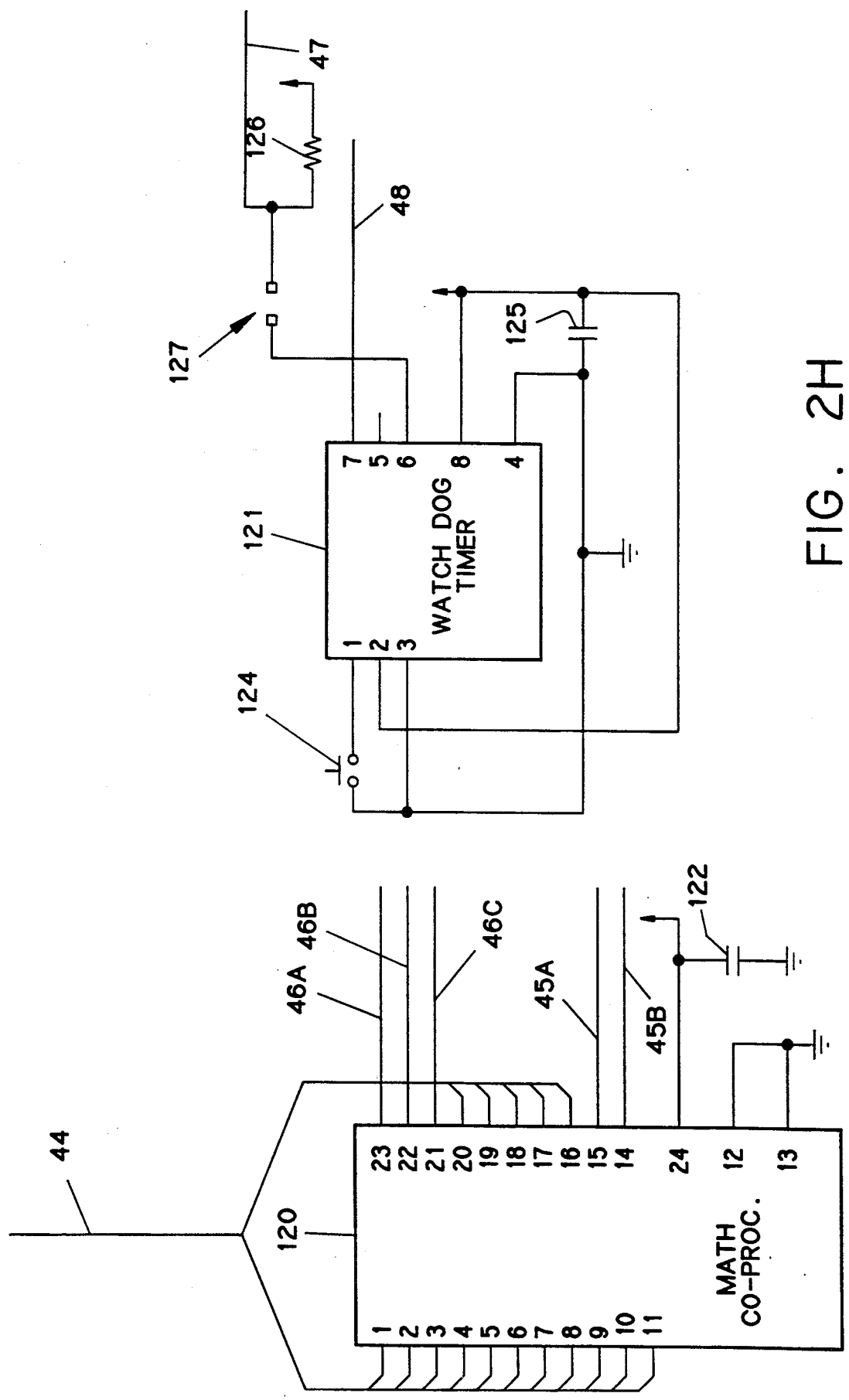

Turning now to the individual parts of the circuit mounted on or forming part of the CPU circuit board include: in FIG. 2A, four position dip switch 50, resistor block 51 with five 10 Kohm resistors, resistor block 52 with nine 10 Kohm resistors, PN2222 NPN transistors 53 and 54, terminals 55 and 56, type 32202 interrupt controller 57, 150 ohm resistors 58 and 59, 0.1 microfarad capacitor 60, and 10 Kohm resistor 61. Throughout the electrical circuits discussed herein, a ground symbol, such as at 62, denotes a connection to ground while an arrow, such as at 63 denotes a connection to the positive five volt power supply. In addition, each electrical circuit element, such as the interrupt controller 57, includes the pin numbers, such as pin number 40 shown at 57A. Each of these electrical circuit elements are conventional and readily attainable at most electrical supply sources, and each comes with literature describing it and its function in detail. Thus the details will not be discussed herein. When a circle, such as 57B, is shown at a pin number, it means the connection to the pin is inverted. The interrupt controller 57 provides interrupt, timer and counter functions for the CPU, the dip switch 50 clears the memory, the terminal 55 connects to the status LEDs such as 19 on the front of the case (FIG. 1), and the terminal 56 connects to the audio transducer 32. Turning to FIG. 2B, the circuit includes connector 64, 10 microfarad capacitor 65, and 10 Kohm resistors 66 and 67. Connector 65 connects to the input-/output circuit board (FIG. 3D). Continuing on to FIGS. 2C and 2D, the circuit includes type 27256 32 kilobyte EPROMs 70A through 70F, type 84256 32 kilobyte RAMs 73A and 73B. Each of the EPROMs 70A through 70F and the RAMs are connected to ground through a 0.1 microfarad capacitor such as 71. Turning to FIG. 2E, the electrical parts include type 74ALS138 3 line to 8 line decoders 80 and 81, 10 Kohm resistors 82 and 84, 0.1 microfarad capacitors 78, 79, 83, and 85, and jumper terminals 87. The elements 92 and 93 floating free in the central part of the figure represent unused portions of a quad OR chip 92 and a hex inverter chip 93, which will be discussed below, and are shown for schematic completeness. In FIG. 2F the electrical components are a type 32008 central processing unit 24 and a type 32201 timing and control chip which comes with the 32008 as part of a set, resistor block 91 with five 10 Kohm resistors, a quad OR gate chip 92 with four two-input OR gates, a hex inverter chip 93, four 47 ohm resistors 95, 10 Kohm resistors 96, 97, and 98, 0.1 microfarad capacitor 99, 0.001 microfarad capacitor 100, 1 microfarad capacitor 101, 20 MHZ oscillator 102, 0.1 microfarad capacitor 103, 30 picofarad capacitor 104, 470 ohm resistor 105, and jumper terminal 106. The electrical components in FIG. 2G include type 74ALS245 octal data bus transceiver 110, type 74ALS73 eight-bit latches 111 and 112, 0.1 microfarad capacitors 114, 115, and 116, 10 Kohm resistor 117, jumper terminal 118, and a gate from the each of the quad OR chip 92 and hex inverter chip 93. Turning to FIG. 2H, the components include type 32081 math co-processor 120, type DS1232 watch-dog timer and power supply monitor 121, 0.1 microfarad capacitors 122 and 125, switch 124, 10 Kohm resistor 126, and jumper terminal 127.

Turning now to FIGS. 3A through 3F the components and connections on the input/output printed circuit board are shown. The cables 130A, 130B, and 130C at the left of FIG. 3A connect to the cable 132 at the top left of FIG. 3B, which in turn connects into the top of FIG. 3C and goes on to FIG. 3D. Cables 134A and 134B connect FIG. 3D to FIG. 3F. Lines 133 in FIG. 3F connect to the lines 133 in FIG. 3C respectively from top to bottom, and similarly lines 137 in the two Figs. connect. Lines 135 and 136 in FIG. 3E connect respectively to the lines 135 and 136 in FIG. 3F. The components in FIG. 3A include type 88C681 Dual UART (Universal Asynchronous Receiver and Transmitter) 140, type LT1039 level converter 141, 3.6864 MHZ oscillator 142, 15 picofarad capacitor 143, 5 picofarad capacitor 144, 0.1 microfarad capacitor 145, 10 Kohm resistors 146 and 148, 220 ohm resistor 147, and connectors 150 and 151. Connector 151 connects to an inventory management circuit board which will not be discussed in detail herein, while connector 150 connects to a standard RS-232 9-pin connector. The level converter 141 provides the signal levels necessary for the RS-232 port. The resistors, such as 149, are resistors that are internal to the LT1039 and are described in the instructions for that chip. The components shown in FIG. 3B include 10 microfarad capacitors 152, 153, and 154, connector terminals 155, 156, and 157, 0.1 microfarad capacitor 158, and type 8255A parallel interface adapter 159. Terminal 155 connects to the controller power supply, terminal 156 connects to the LCD backlight, and the −12 V, +12 V and +5 V outputs provide the board power. Connector 157 connects to the printer controller. FIG. 3C includes the following components: type 8255A parallel interface adapter 160, D.C. to D.C. converter 161, connectors 162, 163, 164, and 165, 10 Kohm resistors 166, and 167, 0.1 microfarad capacitor 168, 10 kohm variable resistor 169, 10 microfarad capacitor 170, 13 Kohm resistor 171, 97.6K ohm resistor 172, 100 microfarad capacitor 173, 330 Henry inductance 176, type 1N4001 diode 174, and 0.1 microfarad capacitor 175. Connector 163 connects to the relay/solid state input board (FIG. 4E), and connectors 164 and 165 connect to the RA probe interface. The D.C. to D.C. converter 161 provides a 21 volt bias power for the display 18. FIG. 3D includes type 8279 keyboard controller 180, type 74LST138 three to eight line decoders 181 and 182, connectors 64, 183, 184, and 185, 0.1 microfarad capacitors 187, 189, and 191, and 10 kohm resistors 188 and 190. Connectors 183, 184, and 185 connect to the keyboard, paper feed switch and keyboard respectively. FIG. 3E shows a type 84256 RAM 193, and 0.1 microfarad capacitor 194, while FIG. 3F shows a type E1330 display controller 196, and 0.1 microfarad capacitor 197.

Turning to FIGS. 4A through 4E the components of the relay/solid state input board are shown. FIG. 4a connects to FIG. 4B via line 200 and to FIG. 4D via lines 201. FIG. 4B connects to FIG. 4D via lines 202; FIG. 4C connects to FIG. 4D via lines 203. If FIG. 4D is placed to the right of FIG. 4E, the connections of the two Figs. via lines 204A through 204F is clear. Considering FIGS. 4A and 4B together, they each show a type ULN2803A driver 206 and 209 respectively, a field wiring connector 207 and 210 respectively, and a series of eight relays 208 and 211 respectively. The drivers 206 and 209 driver the current for the relay coils. FIG. 4C shows a field wiring connector for the solid state input connections and a series of eight solid state input modules, such as 214A and 214B. For each of the modules, such as 214A, the board has five sockets 215, 216, 217, 218, and 219, into which the pins of the module are pushed. The Fig. also includes eight 10 kohm resistors, such as 220A. The solid state input modules, such as 214A, are field installable. Either an A.C. or a D.C. module may be inserted in each location, depending on whether an A.C. or D.C. device is to be connected to the input on connector 213. If a D.C. device is to be installed, then the preferred module is a Grayhill 70M-IDC5 module, such as 14A, if an A.C. device having the commonly available 110 volts power is to be installed, then the preferred module is a Grayhill 70M-IAC5 module, such as 214B, and if an A.C. device having the commonly available 220 volts power is to be installed, then the preferred module is a Grayhill 70M-IAC5-A, such as 214C. Turning to FIG. 4D, chips 222 and 223 are each type CD4094BC and together form a serial to 16 lines of parallel converter. FIG. 4D also includes a type CD4021BC parallel to serial converter 224, a single opto-isolator 225, 4.7 Kohm resistor 226, 0.1 microfarad capacitors 227, 228, and 233, and 1 Kohm resistors 229 through 232. Converter 224 converts the parallel inputs to a serial mode for the microprocessor, while converter 222, 223 converts the serial microprocessor data to parallel to drive the relays. The electrical components shown in FIG. 4E include a type PS2502-04 quad opto-isolator 237, 1 Kohm resistors 238 through 242, 10 microfarad capacitors 243 and 244, and connectors 163 and 245. The opto-isolator prevents noise from the relays from getting back to the logic on the input-/output board. Connector 245 connects to the controller power supply and provides the +5 and +12 power sources for the board.

The connections of the various components should be clear from the drawings and the instructions that come with each component when they are purchased. To specifically identify the connections the signals on each line, where not obvious from the drawing, are as follows. On the interrupt controller 57 the number 21, 30, 31, 32, 27, 3, 2, 12-19, 26, 25, 24, 23, 22, 33-39, 1, 28, and 4-11 pins are connected to the CS, RD, WR, CLK, RST, STI, INT, D7, D6, D5, D4, D3, D2, D1, D0, A4, A8, A2, A1, A0, IR1, IR3, IR7, IR7, IR9, IR11, IR13, IR15, COUT, Q7–Q0 signals respectively. The 2-9 outputs of the resistor block 52 are connected to the INT8-INT1 signals respectively. The No. 16, 14, 12, 10, 8, 6, 4, 2, 24, 25, 7, 5, 8, 1, 9, 11, 13, 15, 20, 18, 21, 23, 22, 17, and 19 pins of connector 64 are connected to the D8, D4, D5, D7, D2, D1, D0, INT1, CLK0, A20, A0, A1, A2, A8, A10, A9, CLK, CS6, INT3, RST-, INT2, RST, WR1, AND RD1 signals respectively. EPROM 70A has its No. 27, 26, 2, 23, 21, 24, 25, 3-10, 22, 20, 00-07 pins are connected to the A14-A0, RD, CS01, D0-D7 signals respectively. Each of the other EPROMs and RAMs in FIGS. 2C and 2D, such as 73A, are connected identically except that the No. 1 and the No. 27 pins of each RAM are connected to the A14 signal and the WR signal respectively, each of the No. 20 pins of EPROMS 70B through 70F and the RAMs 73A and 73B are connected to the CS01 through CS07 signals respectively. The 1-3, 9, and 7 pins of decoder 81 are connected to the A0-A2, CS6 and CS7 signals respectively. The 1-3 pins of decoder 80 are connected to the A15-A17 signals and it 15-7 pins are connected to the CS00-CS07 signals respectively. The 23-1 and 47 pins of CPU 24 are connected to the AD0-AD15 and A16-A23 signals respectively, while the 42 and 46 pins are connected to the ST1 and INT signals respectively. Pins 8 and 10 of hex inverter 93 are connected to the RST- and RST signals respectively. Lines 95A-95D (FIG. 2F) are connected to the WR1, WR, RD1, and RD signals respectively. The No. 7 pin of watch dog timer 121 is connected the KEEP ALIVE signal which also connects to the No. 8 pin of interrupt controller 57. The No. 14 pin of math co-processor 120 is connected to the CLK signal, its No. 15-20 pins are connected to the RST- and the AD15-AD11 signals, and its NO. 1-11 pins are connected to the AD10-AD0 signals. The No. 2-9 pins of latch 112 are connected to the AD15-AD8 signals, while its 12-19 pins are connected to the A8-A15 signals respectively. The No. 2-9 pins of latch 111 are connected to the AD0-AD7 signals, while its 12-19 pins are connected to the A7-A0 signals. The 2-9 pins of bus 110 are connected to the AD0-AD7 signals, while its 11-18 pins are connected to the D7-D0 signals. Turning to FIGS. 3A through 3F, the 1-4, 19, 10, 18, 11, 17, 12, 16, 13, 25, 15, 5, 6, and 26 pins of UART 140n are connected to the A0-A3, D0-D7, RST, INT2, WR1, RD1, and CS62 signals respectively. The 9, 8, 34-27, 35, 36, 5, and 6 pins of PIA 159 are connected to the A0, A1, D0-D7, WR1, RD1, and CS63 signals respectively, while its No. 14 pin is connected to the INT3 signal. The 38-40 pins of PIA 160 are connected to the OIL, WET, and DRY signals on RA interface connector 165, its 2, 3, and 4 pins are connected to the OIL, WET, and DRY signals respectively on RA interface connector 164, its 25-22 pins are connected to the RA3-RA0 signals on connector 165, its 21-18 pins are connected to the RA3-RA0 signals on connector 164, and its 10, 11, 12, 13, and 17 pins are connected to the DATA 0, LATCH I, CLK, LATCH 0, AND DATA I signals respectively on connector 163. The pins on the left side of PIA 160 are connected to the same signals as the corresponding pins on PIA 159. The 10, 12-15 pins of decoder 181 are connected to the CS65, and CS63-CS60 signals respectively, while its 1, 2, 3, and 5, pins are connected to the A10, A19, A20, and CS6 signals respectively, the 21, 12-19, 4, 3, 9, 11, 10, and 22 pins of keyboard controller 180 are connected to the A0, D0-D7, INT1, CLK0, WR1, RD1, And CS61 signals respectively. The No. 54 pin of display controller 196 is connected to the CLK signal, its 57, 59, 60, and 1-6 pins are connected to the A0, and D0-D7 signals respectively, while its 47, 51, 50, and 56 pins are connected to the RST-, WR1, RD1, and CS60 signals. On the relay/SSI board in FIG. 4E, the No. 1, 10, 3, and 5 pins of opto-isolator 237 are connected to the DATA 0, DATA I, CLK, and LATCH I signals respectively of connector 163, while the resistor 238 is connected to the LATCH 0 signal on the connector. As is conventional in such electrical schematics, all pins connected to the same signal are connected to each other. All connections other than those given above in terms of the signals should be clear from the drawings.

Turning now to FIG. 5, the truth table for the keyboard means 11 (FIG. 1), which includes a full ASCII keyboard 15 and function key switches 20, is shown. The keyboard means operates by the keyboard controller driving each one of the C1 through C9 lines along the top to a logic zero and examining the lines B1 through B9 along the left side to see the result. This tells the controller which key has been pressed. It should be noted that the function key switches 20 are integrated into the truth table with the other keys on keyboard 15. Each time a key is pressed, the system emits a short audible beep to indicate that the pressing of the key has been recognized.

Figure 6:
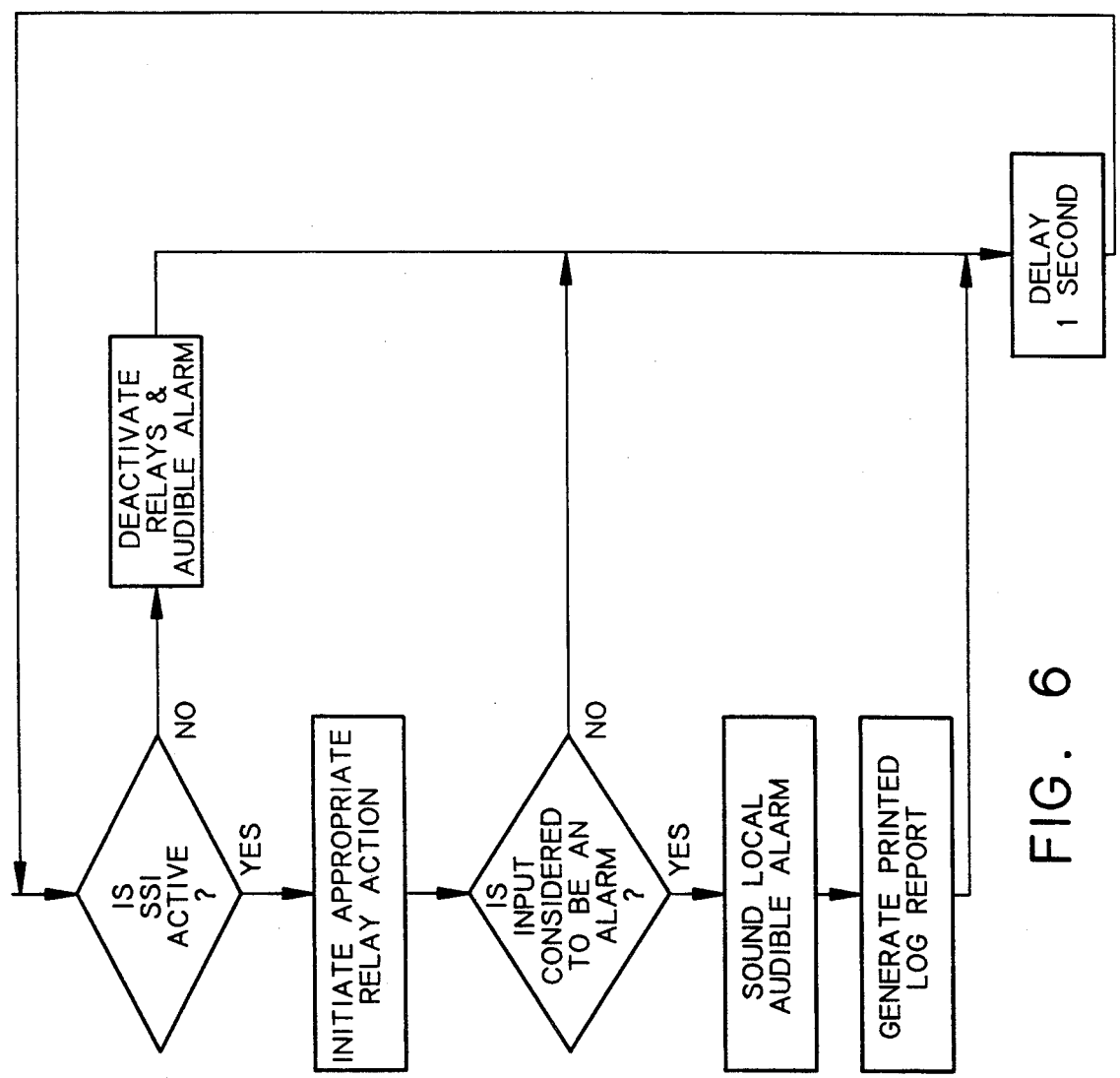
FIG. 6 shows a flow chart of the preferred embodiment of the software for responding to a one-bit-digital input from a solid state input module.

Turning to FIG. 6, the invention functions as follows. At the time of installation of the system, the appropriate modules, 214A, 214B, etc. are selected depending on what electrical devices are desired to be monitored, whether a particular device to be connected to connector 213 is A.C. or D.C., and the voltage of the device. During the configuration and programming of the system the operator selects alarm, latching, and other indicator conditions such as described in U.S. Pat. No. 4,740,777 and co-pending United States patent application Ser. No. (M-7150) (Ser. No. 07-587,932) which is hereby incorporated by reference. The operator further selects whether or not each particular one-bit signal is to be considered to be an alarm, and stores this indicator condition in memory 70. When the system is set up and operating in a monitoring routine, the CPU checks each solid state input module to see if it is active. If it is, appropriate relay action, as indicated by the stored conditions, is initiated. This may involve turning on a pump or causing a wide variety of other machines to be operated. The system then asks whether the particular one-bit signal is considered to be an alarm. If is not, then the system waits for one second then reenters the loop and checks the solid state module again. If the input is considered to be an alarm, then the local alarm is sounded, a log report is generated, and the system then reloops after an one second delay. During the delay periods mentioned above, the control of the system is passed to a taskmaster program, which is a program which manages the many functions of the system. The system returns to this subprogram only if there is an active SSI module.

The input modules, such as 214A, are capable of responding to any of a wide range of voltages, preferably between about 3 to 32 volts D.C., 90 to 140 volts A.C., and 180 to 280 volts A.C. This permits almost any common machine to be monitored by the invention. For example a gasoline pump may be attached to the input, and when the pump operates, the system may take appropriate action. For example, if fluid is detected external of the pump whenever it operates, a message may be sent that the pump is malfunctioning. It should now be clear that the invention permits a wide variety of sophisticated responses to be made by the invention that were not previously possible with prior art fluid detectors. People experienced with the operation of complicated fluid storage and transfer devices will see that the system may be used to anticipate a wide variety of occurrences and prevent small problems from becoming large.

There has been described a fluid detection system that opens up a whole new level of monitoring by such machines. It is evident that those skilled in the art may now make numerous uses and modifications of the specific embodiments described, without departing from the inventive concepts. For example, other alarms and indicators may be added. The system may be made with a wide variety of different electronic parts. The various parts may take on different shapes, relative locations, and sizes. Consequently, the invention is to be construed as embracing each and every novel feature and novel combination of features present in and/or possessed by the fluid detection system described.

What is claimed is:

1. A fluid status detection system comprising:
   (a) a plurality of devices for determining the status of conditions at their locations remote from a controller, each of said devices including means for providing a device signal having a voltage over a range of voltages commonly in use with said fluid detection systems indicative of the status at a device location; and,
   (a) a controller comprising:
      (1) an input means receiving said device signal and providing a one-bit digital signal to said controller;
      (2) a selecting means for permitting an operator to individually select one or more indicator conditions for each of said devices from a plurality of possible indicator alarm conditions;
      (3) a storage means for storing said indicator conditions;
      (4) an activation means receiving said one-bit-digital signals form said input means, comparing said one-bit digital signal with said indicator conditions in said storage means and producing a response determined by said indicator condition; and, (5) an indicator means reacting to said activation means response that produces an output indicating said activation means response.

2. A fluid status detection system as in claim 1 wherein said plurality of devices includes a probe.

3. A fluid status detection system as in claim 1 wherein said plurality of devices includes a fire alarm.

4. A fluid status detection system as in claim 1 wherein said plurality of devices includes a liquid level gauge.

5. A fluid status detection system as in claim 1 wherein said input means includes:

(a) an input module; and, (b) a socket means.

6. A fluid status detection system as in claim 5 wherein said input module can be selected to produce a one-bit digital signal in response to a device operating within a range of working voltages.

7. A fluid status detection system as in claim 5 wherein said input module is an A.C. module that converts an A.C. device signal to a one-bit digital signal.

8. A fluid status detection system as in claim 7 wherein said input module converts a 90 Volt to 140 volt device signal to a one-bit digital signal.

9. A fluid status detection system as in claim 7 wherein said input module converts a 180 Volt to 280 Volt device signal to a one-bit digital signal.

10. A fluid status detection system as in claim 5 wherein said input module is a D.C. module that converts a D.C. device signal to a one-bit digital signal.

11. A fluid status detection system as in claim 10 wherein said input module converts a 3 Volt to 32 Volt device signal to a one-bit digital signal.

12. A fluid status detection system as in claim 5 wherein said socket means provides for installing an input module to provide compatibility between a variety of devices producing device signals over a range of voltages compatible with a controller.

13. A fluid status detection system as in claim 1 wherein said indicator means includes one or more delays.

14. A fluid status detection system as in claim 1 wherein said indicator means includes an audible alarm.

* * * * *